US012627904B2

(12) United States Patent
Ollila

(10) Patent No.: US 12,627,904 B2
(45) Date of Patent: May 12, 2026

(54) SIMULTANEOUS SUBSAMPLING AND HIGH DYNAMIC RANGE IMAGING IN COLOUR FILTER ARRAYS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 191 days.

(21) Appl. No.: 18/431,148

(22) Filed: Feb. 2, 2024

(65) Prior Publication Data

US 2025/0254439 A1     Aug. 7, 2025

(51) Int. Cl.
| | |
|---|---|
| *H04N 25/581* | (2023.01) |
| *H04N 23/617* | (2023.01) |
| *H04N 23/80* | (2023.01) |
| *H04N 23/951* | (2023.01) |
| *H04N 25/13* | (2023.01) |
| *H04N 25/441* | (2023.01) |
| *H04N 25/445* | (2023.01) |
| *H04N 25/447* | (2023.01) |
| *H04N 25/47* | (2023.01) |
| *H04N 25/583* | (2023.01) |
| *H04N 25/585* | (2023.01) |
| *H04N 25/702* | (2023.01) |
| *H04N 25/707* | (2023.01) |

(52) U.S. Cl.
CPC ......... *H04N 25/581* (2023.01); *H04N 23/617* (2023.01); *H04N 23/80* (2023.01); *H04N 23/951* (2023.01); *H04N 25/441* (2023.01); *H04N 25/445* (2023.01); *H04N 25/447* (2023.01); *H04N 25/47* (2023.01); *H04N 25/583* (2023.01); *H04N 25/585* (2023.01);

*H04N 25/702* (2023.01); *H04N 25/707* (2023.01); *H04N 25/134* (2023.01)

(58) Field of Classification Search
None
See application file for complete search history.

(56) References Cited

U.S. PATENT DOCUMENTS

| | | | | |
|---|---|---|---|---|
| 10,958,849 | B1* | 3/2021 | Wang | H04N 23/65 |
| 2008/0180547 | A1* | 7/2008 | Hirose | H04N 25/447 |
| | | | | 348/229.1 |
| 2009/0059048 | A1* | 3/2009 | Luo | H04N 25/46 |
| | | | | 348/308 |
| 2012/0188400 | A1 | 7/2012 | Smith | |
| 2013/0242152 | A1* | 9/2013 | Kasai | H04N 25/589 |
| | | | | 348/294 |

(Continued)

FOREIGN PATENT DOCUMENTS

EP          1176807 A1      1/2002

OTHER PUBLICATIONS

Brandli et al. "A 240—130 dB 3 μs Latency Global Shutter Spatiotemporal Vision Sensor" IEEE Journal of Sold-State Circuits, Vo. 49, No. 10, Oct. 2014, 9 pages.

(Continued)

*Primary Examiner* — Paul M Berardesca
(74) *Attorney, Agent, or Firm* — Ziegler IP Law Group, LLC.

(57)          ABSTRACT

Image data from an image sensor (102, 202, 302, 402) is read out, wherein when reading out, processor(s) (104, 204, 304, 404) is/are configured to employ subsampling. The image data is processed, using neural network(s), to generate an image.

3 Claims, 7 Drawing Sheets

(56) References Cited

U.S. PATENT DOCUMENTS

| | | | |
|---|---|---|---|
| 2014/0293080 A1* | 10/2014 | Choi .................... | H04N 25/704 |
| | | | 348/222.1 |
| 2015/0062368 A1* | 3/2015 | Li ........................ | H04N 23/741 |
| | | | 348/222.1 |
| 2015/0077590 A1* | 3/2015 | Kuriyama .............. | H04N 23/73 |
| | | | 348/308 |
| 2021/0066359 A1 | 3/2021 | Yang et al. | |
| 2021/0248758 A1* | 8/2021 | Li ........................ | G06T 3/4015 |
| 2022/0309712 A1 | 9/2022 | Lee et al. | |
| 2023/0071368 A1 | 3/2023 | Seo et al. | |
| 2023/0164447 A1 | 5/2023 | Wang et al. | |

OTHER PUBLICATIONS

European Patent Office, Extended European Search Report, Application No. 25153875.7, mailed Aug. 8, 2025, 23 pages.

* cited by examiner

SIMULTANEOUS SUBSAMPLING AND HIGH DYNAMIC RANGE IMAGING IN COLOUR FILTER ARRAYS

TECHNICAL FIELD

The present disclosure relates to imaging systems incorporating simultaneous subsampling and high dynamic range imaging in colour filter arrays. The present disclosure also relates to methods incorporating simultaneous subsampling and high dynamic range imaging in colour filter arrays.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

However, existing image generation technology has several limitations associated therewith. Firstly, the existing image generation technology processes image signals captured by pixels of an image sensor of a camera in a manner that such processing requires considerable processing resources, involves a long processing time, requires high computing power, and limits a total number of pixels that can be arranged on an image sensor for full pixel readout at a given frame rate. As an example, image signals corresponding to only about 9 million pixels on the image sensor may be processed currently (by full pixel readout) to generate image frames at 90 frames per second (FPS). Secondly, the existing image processing technology is unable to cope with visual quality requirements, for example, such as a high resolution (such as a resolution higher than or equal to 60 pixels per degree), a small pixel size, and a high frame rate (such as a frame rate higher than or equal to 90 FPS) in some display devices (such as XR devices).

Therefore, in light of the foregoing discussion, there exists a need to overcome the aforementioned drawbacks.

SUMMARY

The present disclosure seeks to provide imaging systems and method to generate high-quality, realistic images (for example, such as high dynamic range (HDR) images) at a high framerate, in a computationally-efficient and a time-efficient manner. The aim of the present disclosure is achieved by imaging systems and methods which incorporate simultaneous subsampling and high dynamic range imaging in colour filter arrays, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS AND DRAWINGS

Figure 1A:
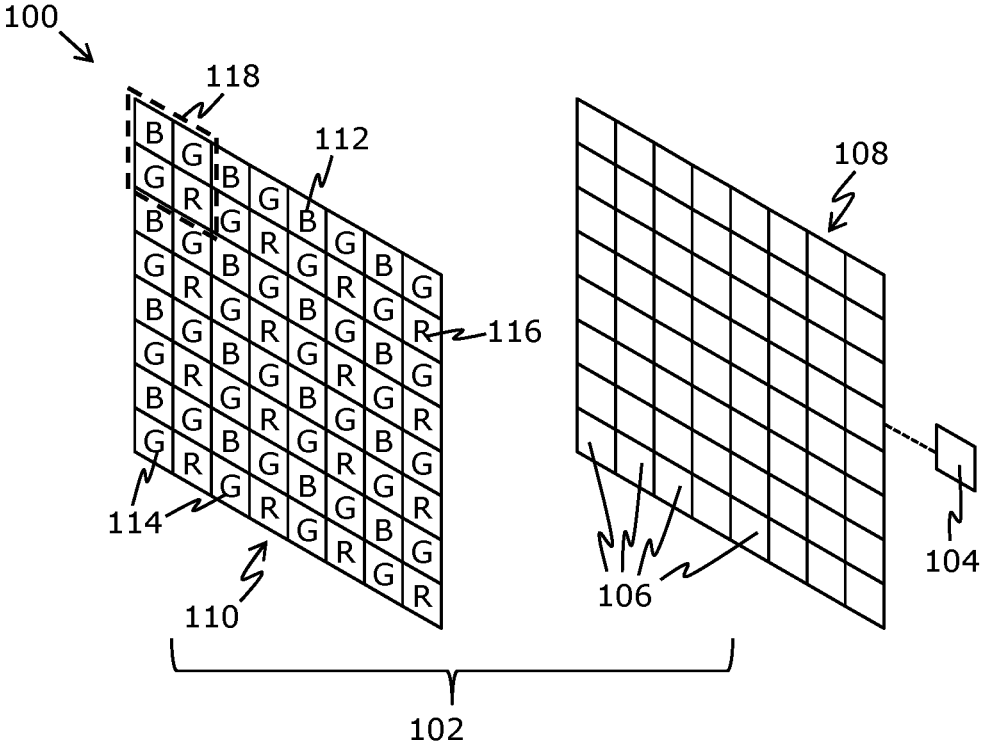
FIG. 1A illustrates a simplified example implementation of an imaging system, in accordance with a first aspect of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Glossary

Brief definitions of terms used throughout the present disclosure are given below.

Throughout the present disclosure, the term "image sensor" refers to a device that detects light from a real-world environment at a plurality of photo-sensitive cells (namely, a plurality of pixels) to capture a plurality of image signals. The plurality of image signals are electrical signals pertaining to a real-world scene of the real-world environment. The plurality of image signals constitute image data of the plurality of photo-sensitive cells. Examples of the image sensor include, but are not limited to, a charge-coupled device (CCD) image sensor, and a complementary metal-oxide-semiconductor (CMOS) image sensor. Image sensors are well-known in the art. It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels (i.e., 25000000 photo-sensitive cells) arranged in the rectangular 2D grid (such as a 5000×5000 grid) on a photo-sensitive surface of the image sensor.

Throughout the present disclosure, the term "image sensor chip" refers to a semiconductor chip comprising an image sensor. It will be appreciated that the image sensor chip may, for example, be made up of a silicon material. Image sensor chips are well-known in the art.

Throughout the present disclosure, the term "image data" refers to information pertaining to a given photo-sensitive cell of an image sensor, wherein said information comprises one or more of: a colour value of the given photo-sensitive cell, a transparency value of the given photo-sensitive cell, an illuminance value (namely, a luminance value or a brightness value) of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar.

Optionally, the image sensor is a part of a camera that is employed to capture image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. The camera may be implemented as a combination of the visible-light camera and a depth camera.

It will be appreciated that the camera could, for example, be arranged anywhere in the real-world environment where a user is present, or could be arranged on a teleport device present in the real-world environment, or could be arranged on a client device of the user. The term "teleport device" refers to specialized equipment that is capable of facilitating virtual teleportation. The term "client device" refers to specialized equipment that is capable of capturing and displaying image(s). In some implementations, the client device could be implemented as a head-mounted display (HMD) device. The term "head-mounted display" device refers to a specialized equipment that is configured to present an extended-reality (XR) environment to the user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. In other implementations, the client device could be implemented as a smart phone of the user, a digital camera of the user, or similar.

Throughout the present disclosure, the term "colour filter array" refers to a pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. The CFA is well-known in the art.

Throughout the present disclosure, the term "smallest repeating unit" in the CFA refers to a smallest grid of colour filters that is repeated in the CFA. In other words, the smallest repeating unit may be understood as a building block that gets repeated (for example, horizontally and/or vertically) to form an entirety of the CFA. A given smallest repeating unit may, for example, be an M×N array of colour filters. In an example, for sake of better understanding and clarity, a given portion of the CFA may comprise 12 smallest repeating units arranged in a 3×4 array, wherein a given smallest repeating unit from amongst the 12 smallest repeating units is a 3×2 array of colour filters. In such an example, the CFA would comprise 72 colour filters. Typically, the photo-sensitive surface of the image sensor has millions of photosensitive cells.

Throughout the present disclosure, the term "red colour filter" refers to a type of colour filter that allow at least one first wavelength lying in a first wavelength range to pass through, wherein the first wavelength range optionally lies from 580 nanometres (nm) to 700 nm.

Throughout the present disclosure, the term "blue colour filter" refers to a type of colour filter that allow at least one second wavelength lying in a second wavelength range to pass through, wherein the second wavelength range optionally lies from 400 nm to 480 nm.

Throughout the present disclosure, the term "green colour filter" refers to a type of colour filter that allow at least one third wavelength lying in a third wavelength range to pass through, wherein the third wavelength range optionally lies from 480 nm to 580 nm.

In some implementations, the "subsampling" could be performed, for example, in a peripheral region of the photo-sensitive surface, the peripheral region surrounding a central region of the photo-sensitive surface (for example, in case of fixed foveation implementations), or surrounding a gaze region of the photo-sensitive surface (for example, in case of active foveation implementations). In other implementations, the subsampling could be performed in an entirety of the photo-sensitive surface (namely, in both the peripheral region and the gaze region (or the central region)). In such implementations, the subsampling could be employed in the entirety of the photo-sensitive surface with a first subsampling density in the gaze region (or the central region) and with a second subsampling density in the peripheral region, the first subsampling density being higher than the second subsampling density.

Optionally, in this regard, at least one processor is configured to: obtain information indicative of a gaze direction of a user; determine the gaze region and the peripheral region in the photo-sensitive surface, based on the gaze direction; and select the peripheral region as said region of the photo-sensitive surface in which the subsampling is to be employed. Optionally, the at least one processor is configured to obtain the information indicative of the gaze direction from the client device, the at least one processor being communicably coupled to the client device. Optionally, the client device comprises gaze-tracking means. The gaze-tracking means are well-known in the art.

The term "subsampling density" refers to a number of photo-sensitive cells that are to be read out (namely, sampled) from at least a region of the photo-sensitive surface per unit area. In this regard, said region may be expressed in terms of a total number of photo-sensitive cells, a number of photo-sensitive cells in both horizontal and vertical dimensions, units of length, or similar. For example, the subsampling density may be 2 photo-sensitive cells per 10 photo-sensitive cells, 4 photo-sensitive cells per 4×4 grid of photo-sensitive cells, 5 photo-sensitive cells per 50 square micrometres of the image sensor, or similar. As another example, the subsampling density may be expressed as a percentage. The subsampling density is well-known in the art.

Throughout the present disclosure, the term "image" refers to a visual representation of the real-world environment. The term "visual representation" encompasses colour information represented in a given image, and additionally optionally other attributes (for example, such as luminance information, transparency information (namely, alpha values), polarization information, and the like) associated with the given image.

Throughout the present disclosure, the term "high-dynamic range image" refers to an image having high-dynamic range (HDR) characteristics. The HDR image represents a real-world scene of the real-world environment being captured using a broader range of brightness levels, as compared to when a standard image is captured. This facilitates in an improved, accurate representation of a dynamic range of said real-world scene, thereby providing enhanced contrast and high visual detail in the HDR image. HDR images and techniques for generating the HDR images are well-known in the art.

The term "exposure time" refers to a time span for which a photo-sensitive surface of an image sensor is exposed to light, so as to capture a given image of a real-world scene of a real-world environment.

Furthermore, the term "sensitivity" refers to a measure of how strongly the photo-sensitive surface of the image sensor responds when exposed to the light, so as to capture a given image of the real-world scene of the real-world environment. Greater the sensitivity of the image sensor, lesser is an amount of light required to capture the given image, and vice versa. Typically, a sensitivity of a camera is expressed in terms of ISO levels, for example, such as lying in a range of ISO 100 to ISO 6400. It will be appreciated that different sensitivities could be obtained by the camera by changing (namely, altering) analog gain and/or digital gain of the camera. A gain of the camera refers to a gain of a charge amplifier of an image sensor of the camera, wherein said charge amplifier is employed while reading out charge values from pixels of the image sensor through analog to digital conversion. Techniques and algorithms for changing the analog gain and/or the digital gain of the camera (in a domain of image signal processing) are well-known in the art.

Moreover, the term "aperture size" refers to a size of an opening present in a camera through which the light emanating from the real-world environment enters the camera, and reaches the photo-sensitive surface of the image sensor of the camera. The aperture size is adjusted to control an amount of light that is allowed to enter the camera, when capturing a given image of the real-world scene of the real-world environment. Typically, the aperture size of the camera is expressed in an F-number format. Larger the aperture size, smaller is the F-number used for capturing images, and narrower is the depth-of-field captured in the images. Conversely, smaller the aperture size, greater is the F-number used for capturing images, and wider is the depth-of-field captured in the images. The F-number could, for example, be F/1.0, F/1.2, F/1.4, F/2.0, F/2.8, F/4.0, F/5.6, F/8.0, F/11.0, F/16.0, F/22.0, F/32.0, and the like. Aperture sizes and their associated F-numbers are well-known in art.

Pursuant to the present disclosure, it will be appreciated that image data (and optionally event data) read out from an image sensor is provided as an input to at least one "neural network" both in a training phase of the at least one neural network and in an inference phase of the at least one neural network (i.e., when the at least one neural is utilised after it has been trained). It will also be appreciated that when the at least one neural network is used, demosaicking and interpolation could be combined as a single operation, unlike in the conventional techniques where the demosaicking and the interpolation are treated as separate operations and where information pertaining to linear or non-linear relationships between neighbouring pixels is necessary for performing these aforesaid operations. The interpolation performed using the at least one neural network can be understood to be inpainting or hallucinating missing image data. In addition to these operations, there could be various image enhancement or image restoration operations s (as mentioned hereinbelow) that can be performed additionally and optionally, using the at least one neural network. In this way, the at least one neural network may be trained to generate accurate missing image data based on available image data. These operations may even be performed at different scales or different levels of detail (i.e., different resolutions) to enhance an overall visual quality of the (generated) image.

Additionally, optionally, a training process of the at least one neural network involves utilising a loss function that is generated based on perceptual loss factors and contextual loss factors. Such a loss function would be different from a loss function utilised in the conventional techniques. The perceptual loss factors may relate to visual perception of the generated image. Instead of solely considering pixel-level differences, the perceptual loss factors aim to measure a similarity in terms of higher-level visual features of an image. The contextual loss factors may take into account a relationship and a coherence between neighbouring pixels in the image. By incorporating the perceptual loss factors and the contextual loss factors into the training process of the at least one neural network, the at least one neural network may generate an image that is visually-pleasing and contextually-coherent. It will be appreciated that the loss function of the at least one neural network could optionally also take into account various image enhancement/restoration operations, in addition to or apart from the demosaicking and the interpolation operations; such various image enhancement/restoration operations may, for example, include at least one of: an image deblurring operation, an image contrast enhancement operation, a low-light enhancement operation, a tone mapping operation, an image colour conversion operation, a super-resolution operation, an image white-balancing operation, an image compression operation.

Furthermore, when evaluating a performance of the at least one neural network and its associated loss function, it may be beneficial to compare the (generated) image with a ground-truth image at different scales/resolutions. This may be done to assess an image quality and a visual fidelity of the (generated) image across various levels of detail/resolutions.

For instance, the aforesaid comparison may be made at a highest resolution, which represents an original resolution of the image. This may allow for a detailed evaluation of a pixel-level accuracy of the (generated) image. Alternatively or additionally, the aforesaid comparison can be made at a reduced resolution, for example, such as a ¼th of the original resolution of the image. This may provide an assessment of an overall perceptual quality and an ability of the at least one network to also capture and reproduce important visual features at coarser levels of detail. Thus, by evaluating the loss function at different scales, more comprehensive understanding of the performance of the at least one neural network can be known. The loss function may encompass various combinations, including but not limited to L1 (basic, Huber, Carbonnier, total variation (TV) loss), MSE (Mean Squared Error), LPIPS (Learned Perceptual Image Patch Similarity), FFT (Fast Fourier Transform), SSIM (Structural Similarity Index Metric), MS-SSIM (Multi-Scale Structural Similarity Index Metric), or other similar metrics. The loss function, the perceptual loss factors, and the contextual loss factors are well-known in the art.

Optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN).

There will now be considered various different aspects of the present disclosure.

First Aspect and Second Aspect

In a first aspect, an embodiment of the present disclosure provides an imaging system comprising:
- an image sensor comprising:
  - a plurality of photo-sensitive cells arranged on a photo-sensitive surface of the image sensor; and
  - a colour filter array comprising a plurality of smallest repeating units, wherein a given smallest repeating unit comprises at least one red colour filter, at least one blue colour filter and at least two green colour filters; and
- at least one processor configured to:
  - read out image data from the image sensor, wherein when reading out, the at least one processor is configured to employ subsampling in at least a region of the photo-sensitive surface, by:
    - reading out the image data from those photo-sensitive cells that correspond to a first set of sequences of smallest repeating units in the colour filter array, a given sequence being a row or a column of the smallest repeating units in the colour filter array; and
    - skipping read out from those photo-sensitive cells that correspond to a second set of sequences of smallest repeating units in the colour filter array, wherein the sequences of the first set and the sequences of the second set are arranged in an alternating manner; and
  - process the image data, using at least one neural network, to generate an image.

In a second aspect, an embodiment of the present disclosure provides a method comprising:
- reading out image data from an image sensor, by employing subsampling in at least a region of a photo-sensitive surface of the image sensor, wherein the image sensor comprises a plurality of photo-sensitive cells arranged on the photo-sensitive surface, and a colour filter array comprising a plurality of smallest repeating units, wherein a given smallest repeating unit comprises at least one red colour filter, at least one blue colour filter and at least two green colour filters, and wherein the step of reading out the image data comprises:
- reading out the image data from those photo-sensitive cells that correspond to a first set of sequences of smallest repeating units in the colour filter array, a given sequence being a row or a column of the smallest repeating units in the colour filter array; and
- skipping read out from those photo-sensitive cells that correspond to a second set of sequences of smallest repeating units in the colour filter array, wherein the sequences of the first set and the sequences of the second set are arranged in an alternating manner; and processing the image data, using at least one neural network, for generating an image.

The present disclosure provides the aforementioned imaging system and the aforementioned method incorporating simultaneous subsampling, to generate high-quality, realistic images at a high framerate, by way of processing the image data read out by employing subsampling, in computationally-efficient and time-efficient manner. Herein, when the subsampling is performed in the aforesaid manner, a processing time for selectively reading out said image data is considerably lesser, as compared to when image data is read out from each and every photo-sensitive cell. Moreover, reading out (and processing) the image data that correspond to the first set of sequences, enables in achieving a high visual quality (for example, in terms of a native resolution, a high contrast, a realistic and accurate colour reproduction, and the like) in corresponding pixels of the image. Furthermore, a selective read out of the image data facilitates in providing a high frame rate of images, whilst reducing computational burden, delays, and excessive power consumption. The imaging system and the method are susceptible to cope with visual quality requirements, for example, such as a high resolution (such as a resolution higher than or equal to 60 pixels per degree), a small pixel size, and a large field of view, whilst achieving a high (and controlled) frame rate (such as a frame rate higher than or equal to 90 FPS). The imaging system and the method are simple, robust, fast, reliable, support real-time simultaneous subsampling, and can be implemented with ease.

There will now be provided details of various operations as described earlier with respect to the aforementioned first aspect.

It will be appreciated that when the given smallest repeating unit comprises a red colour filter, a blue colour filter, and two green colour filters, the CFA may be a Bayer CFA. Moreover, when the given smallest repeating unit comprises two red colour filters, two blue colour filters, and five green colour filters, the CFA may be an X-Trans CFA. Apart from the Bayer CFA and the X-Trans CFA, other similar types of CFAs may also be possible, based on different numbers of red colour filters, blue colour filters, and green colour filters. The Bayer CFA and the X-Trans CFA are well-known in the art.

Optionally, the given smallest repeating unit further comprises at least one cyan colour filter, at least one yellow colour filter, and at least two magenta colour filters, in addition to the at least one red colour filter, the at least one blue colour filter and the at least two green colour filters. In this regard, a fourth wavelength range that corresponds to the at least one cyan colour filter optionally lies from 490 nm to 520 nm, a fifth wavelength range that corresponds to the at least one yellow colour filter optionally lies from 570 nm to 590 nm, and a sixth wavelength range that corresponds to the at least two magenta colour filters optionally lies from 600 nm to 660 nm.

The at least one processor controls an overall operation of the imaging system of the aforementioned first aspect. The at least one processor is communicably coupled to at least the image sensor. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Notably, when the at least one processor employs the subsampling in at least the region of the photo-sensitive surface, the image data is selectively read out from at least the region of the photo-sensitive surface. In other words, the image data is read out from only some photo-sensitive cells in at least said region, instead of reading out the image data from each and every photo-sensitive cell in at least said region.

In particular, the at least one processor reads out those photo-sensitive cells that correspond to the first set of sequences of the smallest repeating units in the CFA, wherein the given sequence is any one of: an odd-number sequence of the smallest repeating units, an even-number sequence of the smallest repeating units. The odd-number sequence could be any one of: an odd row of the smallest repeating units in the CFA, an odd column of the smallest repeating units in the CFA. The even-number sequence could be any one of: an even row of the smallest repeating units in the CFA, an even column of the smallest repeating units in the CFA. In addition to this, the at least one processor does not read out (namely, skips) those photo-sensitive cells that correspond to the second set of sequences of smallest repeating units in the CFA, wherein a given sequence in the second set is another of: the odd-number sequence of the smallest repeating units, the even-number sequence of the smallest repeating units.

As an example, for sake of simplicity and better understanding, the CFA may comprise 16 smallest repeating units are arranged in a 4×4 array, each smallest repeating unit comprising one red colour filter, one blue colour filter, and two green colour filters. Herein, the image data may be read out from those photo-sensitive cells that correspond to odd rows (namely, a first row, a third row, and a fifth row) of smallest repeating units, each odd row comprising 4 smallest repeating units. The image data may not be read out (i.e., skipped) from those photo-sensitive cells that correspond to even rows (namely, a second row, a fourth row, and a sixth row) of smallest repeating units, each even row comprising 4 smallest repeating units.

Beneficially, when the subsampling is performed in the aforesaid manner, a processing time for selectively reading out the image data from at least the region of the photo-sensitive surface is considerably lesser, as compared to a processing time for reading out the image data from each and every photo-sensitive cell in at least said region. It will be appreciated that reading out (and processing) the image data from those photo-sensitive cells that correspond to the first set of sequences, enables in achieving a high visual quality (for example, in terms of a native resolution, a high contrast, a realistic and accurate colour reproduction, and the like) in corresponding pixels of the image (that is generated upon processing the image data, as discussed later). This is because colour filters present in the sequences of the first set facilitate in providing better colour reproduction and resolution in the corresponding pixels of the image. It will also be appreciated that such a selective read out of the image data in at least said region facilitates in providing a high frame rate of images. This implementation has been also illustrated in conjunction with FIGS. 1B and 1C, for sake of better understanding and clarity.

Notably, upon reading out the image data, the image data is processed by the at least one processor using the at least one neural network, to generate the image. Optionally, in this regard, an input of the at least one neural network comprises the (subsampled) image data, and an output of the at least one neural network comprises image data of pixels of the image, upon processing the image data. It will be appreciated that when processing the image data, the at least one neural network performs interpolation and demosaicking operations on the image data, to generate the image. Thus, the at least one neural network can efficiently utilise even incomplete (i.e., subsampled) image data to generate the image that is accurate and realistic. For this, the at least one neural network may perform the interpolation and/or the demosaicking (as and when required) in a highly accurate manner, as compared to conventional techniques. The interpolation and the demosaicking are well-known in the art. Optionally, the input of the at least one neural network further comprises information indicative of a resolution (for example, such as in terms of pixels per degree) of the image data. However, when it is already known to the at least one neural network that the image sensor reads out the image data at a particular resolution, said information may not be required to be provided as the input each time.

Referring to FIG. 1A, illustrated is a simplified example implementation of an imaging system 100, in accordance with the first aspect of the present disclosure. The simplified example implementation has been shown using an exploded view in FIG. 1A. The imaging system 100 comprises an image sensor 102 and at least one processor (depicted as a processor 104). The image sensor 102 comprises a plurality of photo-sensitive cells 106 arranged on a photo-sensitive surface 108, and a colour filter array (CFA) 110. The processor 104 is shown to be communicably coupled to the image sensor 102 (specifically, to the plurality of photo-sensitive cells 106). For sake of simplicity and clarity, a portion of the CFA 110 is shown corresponding to a portion of the photo-sensitive surface 108. In the shown portion of the CFA 110, "B" refers to blue colour filters 112, "G" refers to green colour filters 114, and "R" refers to red colour filters 116. Said portion of the photo-sensitive surface 108 comprises 64 photo-sensitive cells arranged in an 8×8 grid, and colour filters in the shown portion of the CFA 110 are arranged in front of respective ones of the 64 photo-sensitive cells. The CFA 110 comprises a plurality of smallest repeating units, wherein a given smallest repeating unit 118 (depicted as a 2×2 array of colour filters, using a dashed line box) is repeated throughout the CFA 110. With reference to FIG. 1A, the given smallest repeating unit 118 comprises two green colour filters 114, one red colour filter 116, and one blue colour filter 112, and the CFA 110 is shown as a typical Bayer CFA, for illustration purposes only. The shown portion of the CFA 110 comprises 64 colour filters arranged in an 8×8 array. It will be appreciated that a photo-sensitive surface of a typical image sensor has millions of photosensitive cells (namely, pixels).

It may be understood by a person skilled in the art that FIG. 1A includes a simplified example implementation of the imaging system 100, for sake of clarity, which should not unduly limit the scope of the claims herein. It is to be understood that the specific implementation of the imaging system 100 is not to be construed as limiting it to specific numbers or types of image sensors, processors, photo-sensitive cells, colour filters, and colour filter arrays. The person skilled in the art will recognize many variations, alternatives, and modifications of embodiments of the present disclosure.

Figure 1B:
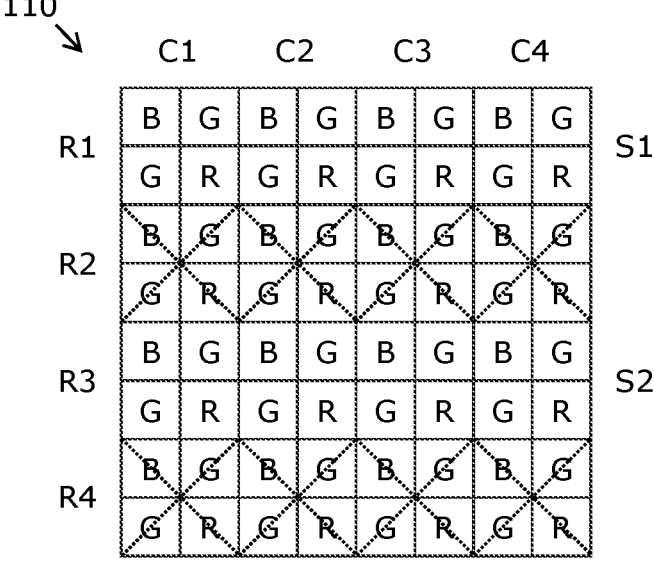
FIGS. 1B and 1C illustrate exemplary ways of reading out image data from a region of a photo-sensitive surface of an image sensor, in accordance with different embodiments of the first aspect and a second aspect of the present disclosure.
Figure 1C:
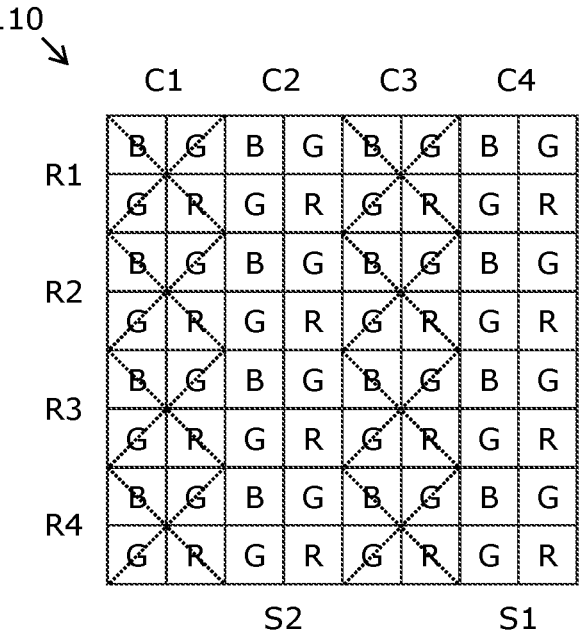

Referring to FIGS. 1B and 1C, illustrated are exemplary ways of reading out image data from a region of the photo-sensitive surface 108 of the image sensor 102, in accordance with different embodiments of the first aspect and the second aspect of the present disclosure. With reference to FIGS. 1B and 1C, notably, the shown portion of the CFA 110 has 4 rows R1, R2, R3, and R4 of the smallest repeating units, each row comprising 4 smallest repeating units, and has 4 columns C1, C2, C3, and C4 of the smallest repeating units, each column comprising 4 smallest repeating units. With reference to FIGS. 1B and 1C, notably, the shown portion of the CFA 110 has 4 rows R1, R2, R3, and R4 of the smallest repeating units, each row comprising 4 smallest repeating units, and has 4 columns C1, C2, C3, and C4 of the smallest repeating units, each column comprising 4 smallest repeating units.

With reference to FIG. 1B, when performing subsampling, out of 64 photo-sensitive cells, the image data is read out from 32 photo-sensitive cells that correspond to odd rows (namely, the rows R1 and R3) of the smallest repeating units in the shown part of the CFA 110, while the image data is not read out (namely, is skipped) from remaining 32 photo-sensitive cells (crossed out as dotted 'X's) that correspond to even rows (namely, the rows R2 and R4) of the smallest repeating units in the shown part of the CFA 110. Herein, it is to be noted that the subsampling is performed in a row-wise manner.

With reference to FIG. 1C, when performing subsampling, out of 64 photo-sensitive cells, the image data is read out from 32 photo-sensitive cells that correspond to even columns (namely, the columns C2 and C4) of the smallest repeating units in the shown part of the CFA 110, while the image data is not read out (namely, is skipped) from remaining 32 photo-sensitive cells (crossed out as dotted 'X's) that correspond to odd columns (namely, the columns C1 and C3) of the smallest repeating units in the shown part of the CFA 110. Herein, it is to be noted that the subsampling is performed in a column-wise manner.

FIGS. 1B and 1C are merely examples, which should not unduly limit the scope of the claims herein. The person skilled in the art will recognize many variations, alternatives, and modifications of embodiments of the present disclosure.

Optionally, the image data is read out from the photo-sensitive cells that correspond to the first set of sequences of the smallest repeating units using at least two different settings pertaining to at least one of: an exposure time, a sensitivity, an aperture size, wherein the image is generated as a high dynamic range (HDR) image. In this regard, the image data (corresponding to the first set of sequences) is read out using the at least two different settings i.e., using at least one of: different exposure times, different sensitivities, different aperture sizes. The technical benefit of using the at least two different settings for reading out the (subsampled) image data is that it facilitates in generating HDR images, without reducing any frame rate (i.e., there would not be any frame rate drop). Optionally, when processing the (subsampled) image data that is read out using the at least two different settings, the at least one neural network performs at least one operation on said image data, that provide a result that is similar to applying at least one HDR imaging technique on said image data. The at least one HDR imaging technique may, for example, be an HDR tone-mapping technique, an HDR exposure bracketing technique, an HDR exposure fusion technique, a dual ISO technique, an edge-preserving filtering technique (for example, such as a guided image filtering technique).

Referring again to FIGS. 1B and 1C, "S1" refers to a first setting and "S2" refers to a second setting, wherein the first setting S1 and the second setting S2 are different from each other, and pertain to at least one of:

different exposure times, different sensitivities, different aperture sizes. With reference to FIG. 1B, the image data is read out from 16 photo-sensitive cells that correspond to the (odd) row R1 of the smallest repeating units, using the first setting S1. The image data is read out from 16 photo-sensitive cells that correspond to the (odd) row R3 of the smallest repeating units, using the second setting S2. The image data corresponding to the (odd) row R1 and the (odd) row R3 may be processed to generate an HDR image. With reference to FIG. 1C, the image data is read out from 16 photo-sensitive cells that correspond to the (even) column C2 of the smallest repeating units, using the second setting S2. The image data is read out from 16 photo-sensitive cells that correspond to the (even) column C4 of the smallest repeating units, using the first setting S1. The image data corresponding to the (even) column C2 and the (even) column C4 may be processed to generate an HDR image.

Optionally, the first set of sequences comprises a first sub-set of sequences and a second sub-set of sequences, the sequences of the first sub-set and the sequences of the second sub-set being arranged in an alternating manner, wherein the at least two different settings comprise at least one first setting and at least one second setting using which the image data is read out from photo-sensitive cells that correspond to the first sub-set and photo-sensitive cells that correspond to the second sub-set, respectively.

In this regard, the image data corresponding to all sequences of the smallest repeating units that belong to the first sub-set is read out using the at least one first setting, while the image data corresponding to all sequences of the smallest repeating units that belong to the second sub-set is read out using the at least one second setting. The technical benefit of using the at least one first setting and the at least one second setting in the aforesaid manner facilitates in generating images in a highly accurate and realistic manner, and with high visual detail (i.e., with HDR characteristics), without negatively affecting a frame rate of generating images.

In an example, for sake of simplicity and better understanding, a part of a CFA may comprise 8 rows R1, R2, R3, R4, R5, R6, R7, and R8 of smallest repeating units, namely 8 sequences of smallest repeating units arranged in a row-wise manner. Out of these 8 rows, only rows R1, R3, R5 and R7 may be read out, while remaining rows R2, R4, R6 and R8 may not be read out, namely, skipped for reading. In other words, the rows R1, R3, R5 and R7 correspond to the first set of sequences, while the rows R2, R4, R6 and R8 correspond to the second set of sequences. Herein, within the first set of sequences, the first sub-set may comprise rows R1 and R5, while the second sub-set may comprise remaining rows R3 and R7, wherein said odd rows R1, R3, R5, and R7 are arranged in an alternating manner. In such a case, when the subsampling is performed in a row-wise manner, the image data corresponding to the rows R1 and R5 may be read out using the at least one first setting, while the image data corresponding to the rows R3 and R7 may be read out using the at least one second setting.

In another example, for sake of simplicity and better understanding, a part of a CFA may comprise 8 columns C1, C2, C3, C4, C5, C6, C7, and C8 of smallest repeating units, namely 8 sequences of smallest repeating units arranged in a column-wise manner. Out of these 8 columns, only columns C2, C4, C6 and C8 may be read out, while remaining columns C1, C3, C5 and C7 may not be read out, namely, skipped for reading. In other words, the columns C2, C4, C6 and C8 correspond to the first set of sequences, while the columns C1, C3, C5 and C7 correspond to the second set of sequences. Herein, within the first set of sequences, the first sub-set may comprise columns C2 and C6 of the smallest repeating units, and the second sub-set may comprise remaining columns C4 and C8 of the smallest repeating units, wherein said columns C2, C4, C6, and C8 are arranged in an alternating manner. In such a case, when the subsampling is performed in a column-wise manner, the image data corresponding to the columns C2 and C6 may be read out using the at least one second setting, while the image data corresponding to the columns C4 and C8 may be read out using the at least one first setting.

It will be appreciated that more than one first setting could be used when reading out the image data from the photo-sensitive cells that correspond to different sequences (namely, different rows or columns) in the first sub-set. Similarly, more than one second setting could be used when reading out the image data from the photo-sensitive cells that correspond to different sequences in the second sub-set. For example, the at least one first setting may pertain to more than one large aperture size (for example, such as F/1.0, F/1.2, F/1.4, and F/2.0), and the at least one second setting may pertain to more than one small aperture size (for example, such as F/5.6, F/8.0, F/11.0, F/16.0, F/22.0, and F/32.0). It will be appreciated that any one of: the more than one large aperture size, the more than one small aperture size, may even comprise at least one medium aperture size (for example, such as F/2.8 and F/4.0).

The present disclosure also relates to the method of the second aspect as described above. Various embodiments and variants disclosed above, with respect to the aforementioned first aspect, apply mutatis mutandis to the method of the second aspect.

Optionally, in the method, the step of reading out the image data from the photo-sensitive cells that correspond to the first set of sequences of the smallest repeating units is performed using at least two different settings pertaining to at least one of: an exposure time, a sensitivity, an aperture size, wherein the image is generated as a high dynamic range (HDR) image.

Optionally, in the method, the first set of sequences comprises a first sub-set of sequences and a second sub-set of sequences, the sequences of the first sub-set and the sequences of the second sub-set being arranged in an alternating manner, wherein the at least two different settings comprise at least one first setting and at least one second setting using which the image data is read out from photo-sensitive cells that correspond to the first sub-set and photo-sensitive cells that correspond to the second sub-set, respectively.

Third Aspect and Fourth Aspect

In a third aspect, an embodiment of the present disclosure provides an imaging system comprising:
    an image sensor comprising:
        a plurality of photo-sensitive cells arranged on a photo-sensitive surface of the image sensor; and
        a colour filter array comprising a plurality of smallest repeating units arranged sequentially, wherein a given smallest repeating unit comprises one array of red colour filters, one array of blue colour filters and two arrays of green colour filters; and
    at least one processor configured to:
        read out image data from the image sensor, wherein when reading out, the at least one processor is configured to employ subsampling in at least a region of the photo-sensitive surface, by:
            reading out the image data from those photo-sensitive cells that correspond to at most 75 percent of each array of colour filters in smallest repeating units, wherein at least two different settings pertaining to at least one of: an exposure time, a sensitivity, an aperture size are used for different colour filters in a given array of a same colour; and
            skipping read out from those photo-sensitive cells that correspond to a remainder of each array of colour filters in the smallest repeating units; and
        process the image data, using at least one neural network, to generate a high dynamic range (HDR) image.

In a fourth aspect, an embodiment of the present disclosure provides a method comprising:
    reading out image data from an image sensor, by employing subsampling in at least a region of a photo-sensitive surface of the image sensor, wherein the image sensor comprises a plurality of photo-sensitive cells arranged on the photo-sensitive surface, and a colour filter array comprising a plurality of smallest repeating units arranged sequentially, wherein a given smallest repeating unit comprises one array of red colour filters, one array of blue colour filters and two arrays of green colour filters, and wherein the step of reading out the image data comprises:
        reading out the image data from those photo-sensitive cells that correspond to at most 75 percent of each array of colour filters in smallest repeating units, wherein at least two different settings pertaining to at least one of: an exposure time, a sensitivity, an aperture size, are used for different colour filters in a given array of a same colour; and
        skipping read out from those photo-sensitive cells that correspond to a remainder of each array of colour filters in the smallest repeating units; and
    processing the image data, using at least one neural network, for generating a high dynamic range (HDR) image.

The present disclosure provides the aforementioned imaging system and the aforementioned method incorporating simultaneous subsampling and HDR imaging in colour filter arrays, to generate high-quality, realistic HDR images at a high framerate, in computationally-efficient and time-efficient manner. Herein, when the subsampling is performed in the aforesaid manner, a processing time for selectively reading out said image data is considerably lesser, as compared to when image data is read out from each and every photo-sensitive cell. Moreover, reading out (and processing) the image data that the at most 75 percent of each array of the colour filters in the smallest repeating units, enables in achieving a high visual quality (for example, in terms of a native resolution, a high contrast, a realistic and accurate colour reproduction, and the like) in corresponding pixels of the image. Furthermore, a selective read out of the image data facilitates in providing a high frame rate of images, whilst reducing computational burden, delays, and excessive power consumption. The imaging system and the method are susceptible to cope with visual quality requirements, for example, such as a high resolution (such as a resolution higher than or equal to 60 pixels per degree), a small pixel size, and a large field of view, whilst achieving a high (and controlled) frame rate (such as a frame rate higher than or equal to 90 FPS). The imaging system and the method are simple, robust, fast, reliable, support real-time simultaneous subsampling and HDR imaging, and can be implemented with ease.

There will now be provided details of various operations as described earlier with respect to the aforementioned third aspect. It is to be understood that some common details of the aforementioned third aspect have already been described earlier with respect to the aforementioned first aspect, and have not been described again, for sake of brevity and avoiding repetition.

It will be appreciated that when the given smallest repeating unit comprises one 2×2 array of red colour filters, one 2×2 array of blue colour filters, and two 2×2 arrays of green colour filters, the CFA comprising such smallest repeating units may be referred to as a 4C Bayer CFA (also referred to as "quad Bayer CFA" or "tetra Bayer CFA", wherein a group of 2×2 photo-sensitive cells has a same colour filter). Similarly, when the given smallest repeating unit comprises one 3×3 array of red colour filters, one 3×3 array of blue colour filters, and two 3×3 arrays of green colour filters, the CFA comprising such smallest repeating units may be referred to as a 9C Bayer CFA (also referred to as "nona Bayer CFA", wherein a group of 3×3 photo-sensitive cells has a same colour filter). Furthermore, when the given smallest repeating unit comprises one 4×4 array of red colour filters, one 4×4 array of blue colour filters, and two 4×4 arrays of green colour filters, the CFA comprising such smallest repeating units may be referred to as a 16C Bayer CFA (also referred to as "hexadeca Bayer CFA", wherein a group of 4×4 photo-sensitive cells has a same colour filter).

Optionally, when the plurality of smallest repeating units are arranged sequentially in the CFA, sets of repeating rows or columns of colour filters are formed in the CFA. Optionally, in this regard, a given set of repeating rows or columns of the colour filters comprises N rows or columns of the colour filters that repeat consecutively. In an example, for a 4C Bayer CFA, a given set of repeating rows comprise two rows or two columns of the colour filters that repeat consecutively (i.e., N=2). In another example, for a 9C Bayer CFA, a given set of repeating rows comprises three rows or three columns of the colour filters that repeat consecutively (i.e., N=3). In another example, for a 16C Bayer CFA, a given set of repeating rows comprises four rows or four columns of the colour filters that repeat consecutively (i.e., N=4).

The at least one processor controls an overall operation of the imaging system of the aforementioned third aspect. The at least one processor is communicably coupled to at least the image sensor. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Notably, when the at least one processor employs the subsampling in at least the region of the photo-sensitive surface, the image data is selectively read out from at least the region of the photo-sensitive surface. In particular, the at least one processor reads out those photo-sensitive cells that correspond to a maximum of 75 percent of each array of the colour filters in the smallest repeating units, using the at least two different settings for the different colour filters in the given array of the same colour. In other words, when the plurality of smallest repeating units are arranged sequentially in the CFA, the at least one processor reads out from any of 1 row or column to N−1 rows or columns, out of N rows or columns in each set of the repeating rows or columns in a manner that the at least two different settings are used for the different colour filters in the given array of the same colour. In an example, for N=2 (i.e., in a case of the 4C Bayer CFA), the at least one processor may read out from any 1 row or column out of 2 rows or columns in each set of the repeating rows or columns. In such a case, when the at least one processor reads out from the 1 row or column, 50 percent subsampling is performed. In another example, for N=3 (i.e., in a case of the 9C Bayer CFA), the at least one processor may read out from 1 or 2 rows or columns out of 3 rows or columns in each set of the repeating rows or columns. In such a case, when the at least one processor reads out from the 1 row or column, 33.33 percent subsampling is performed, whereas when the at least one processor reads out from the 2 rows or columns, 66.66 percent subsampling is performed. In yet another example, for N=4 (i.e., in a case of the 16C Bayer CFA), the at least one processor may read out from any 1 row or column to 3 rows or columns, out of 4 rows or columns in each set of the repeating rows or columns. In such a case, when the at least one processor reads out from the 1 row or column, 25 percent subsampling is performed. When the at least one processor reads out from 2 rows or columns, 50 percent subsampling is performed. When the at least one processor reads out from the 3 rows or columns, 75 percent subsampling is performed.

Notably, in addition to this, the at least one processor does not read out (namely, skips) those photo-sensitive cells that correspond to remaining row(s) or column(s) out of the N rows or columns of the colour filters in each set of the repeating rows or columns. In an example, for N=2 (i.e., in a case of the 4C Bayer CFA), the at least one processor may read out from a first row R1 out of two rows R1 and R2, and may skip read out from a (remaining) second row R2 out of the two rows R1 and R2, in a given set of the repeating rows. For sake of better understanding and clarity, this example has been also illustrated in conjunction with FIG. 2B. Alternatively, in such an example, the at least one processor may read out from a second column C2 out of two columns C1 and C2, and may skip read out from a (remaining) first column C1 out of the two columns C1 and C2, in a given set of the repeating columns.

In another example, for N=3 (i.e., in a case of the 9C Bayer CFA), there could be six different scenarios for reading out the image data. In a first scenario, the at least one processor may read out from a first column C1 out of three columns C1, C2, and C3, and may skip read out from a second column C2 and a third column C3. In a second scenario, the at least one processor may read out from a second columns C2 out of three columns C1-C3, and may skip read out from a first column C1 and a third column C3. In a third scenario, the at least one processor may read out from a third column C3 out of three columns C1-C3, and may skip read out from a first column C1 and a second column C2. In a fourth scenario, the at least one processor may read out from a first column C1 and a second column C2 out of three columns C1-C3, and may skip read out from a third column C3. In a fifth scenario, the at least one processor may read out from a second column C2 and a third column C3 out of three columns C1-C3, and may skip read out from a first column C1. In a sixth scenario, the at least one processor may read out from a first column C1 and a third column C3 out of three columns C1-C3, and may skip read out from a second column C2. Such a manner of reading out and skipping the image data could alternatively be performed for a given set of the repeating rows in the 9C Bayer CFA.

It will be appreciated that the image data could be optionally read out from both row(s) and column(s) out of N rows and N columns of the colour filters in each set of repeating rows and repeating columns, respectively. In such a case, reading out can be skipped from both remaining row(s) and remaining column(s) out of the N rows and the N columns, respectively. Such a reading out is performed in a manner that only those photo-sensitive cells that correspond to at most 75 percent of each array of the colour filters in the smallest repeating units are read out from the image sensor.

Beneficially, when the subsampling is performed in the aforesaid manner, a processing time for selectively reading out the image data from at least the region of the photo-sensitive surface is considerably lesser, as compared to a processing time for reading out the image data from each and every photo-sensitive cell in at least said region. In addition to this, reading out (and processing) the image data from those photo-sensitive cells that correspond to the at most 75 percent of each array of the colour filters in the smallest repeating units, enables in accurately and reliably generating image data corresponding to unread photo-sensitive cells in at least said region, using image data corresponding to read out photo-sensitive cells. Moreover, reading out the (subsampled) image data using at least one of: different exposure times, different sensitivities, different aperture sizes facilitates in generating the HDR image, without reducing any frame rate and in a computationally-efficient manner. Thus, the subsampling combined with using the at least two different settings in the aforesaid manner may facilitate in achieving a high visual quality (for example, in terms of a native resolution, a high contrast, a realistic and accurate colour reproduction, and the like) in corresponding pixels of the HDR image. It will be appreciated that such a selective read out of the image data in at least said region also facilitates in providing a high frame rate of images.

Notably, upon reading out the image data, said image data is processed to generate the HDR image in a similar manner as discussed earlier in detail, with respect to the aforementioned first aspect.

Figure 2A:
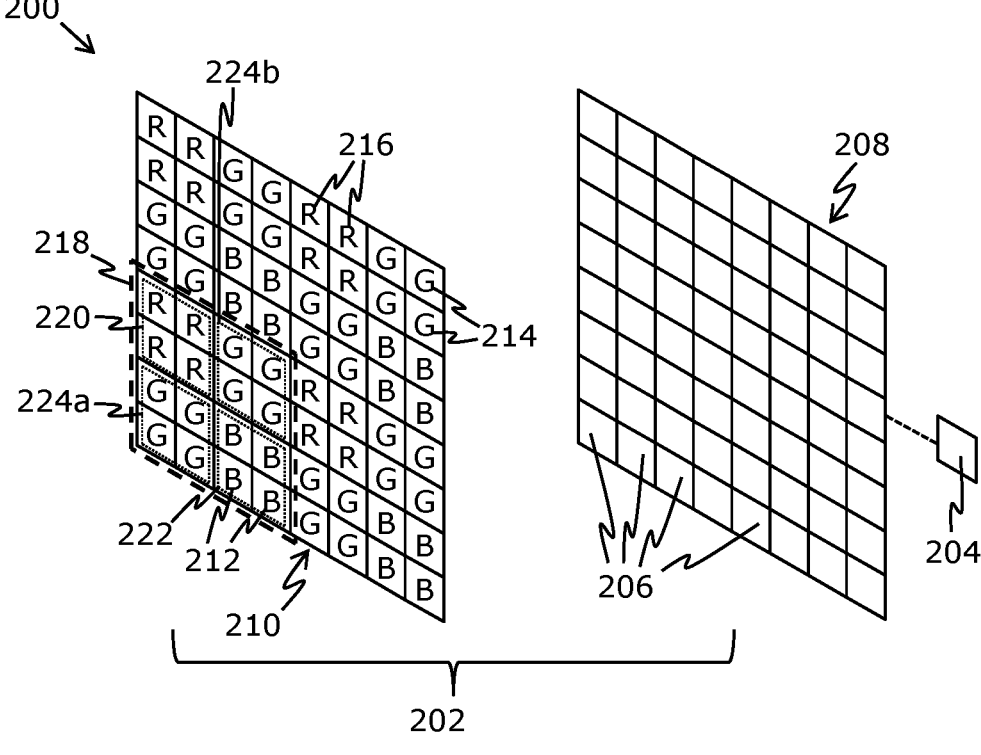
FIG. 2A illustrates a simplified example implementation of an imaging system, in accordance with a third aspect of the present disclosure.

Referring to FIG. 2A, illustrated is a simplified example implementation of an imaging system 200, in accordance with the third aspect of the present disclosure. The simplified example implementation has been shown as an exploded view in FIG. 2A. The imaging system 200 comprises an image sensor 202 and at least one processor (depicted as a processor 204). The image sensor 202 comprises a plurality of photo-sensitive cells 206 arranged on a photo-sensitive surface 208, and a colour filter array (CFA) 210. The processor 204 is shown to be communicably coupled to the image sensor 202 (specifically, to the plurality of photosensitive cells 206). For sake of simplicity and clarity, a portion of the CFA 210 is shown corresponding to a portion of the photo-sensitive surface 208. In the shown portion of the CFA 210, "B" refers to blue colour filters 212, "G" refers to green colour filters 214, and "R" refers to red colour filters 216. Said portion of the photo-sensitive surface 208 comprises 64 photo-sensitive cells arranged in an 8×8 grid, and colour filters in the shown portion of the CFA 210 are arranged in front of respective ones of the 64 photo-sensitive cells. The CFA 210 comprises a plurality of smallest repeating units arranged sequentially, wherein a given smallest repeating unit 218 (depicted as a 4×4 array of colour filters, using a dashed line box) is repeated throughout the CFA 210. With reference to FIG. 2A, the given smallest repeating unit 218 comprises one 2×2 array 220 of red colour filters 216, one 2×2 array 222 of blue colour filters 212, and two 2×2 arrays 224a and 224b of green colour filters 214, and the CFA 210 is shown as a quad Bayer CFA, for illustration purposes only. All the arrays 220, 222, 224a-b are depicted using dotted-line boxes. The shown portion of the CFA 210 comprises 64 colour filters arranged in an 8×8 array. It will be appreciated that a photo-sensitive surface of a typical image sensor has millions of photosensitive cells (namely, pixels).

It may be understood by a person skilled in the art that FIG. 2A includes a simplified example implementation of the imaging system 200, for sake of clarity, which should not unduly limit the scope of the claims herein. It is to be understood that the specific implementation of the imaging system 200 is not to be construed as limiting it to specific numbers or types of image sensors, processors, photo-sensitive cells, colour filters, and colour filter arrays. The person skilled in the art will recognize many variations, alternatives, and modifications of embodiments of the present disclosure.

Figure 2B:
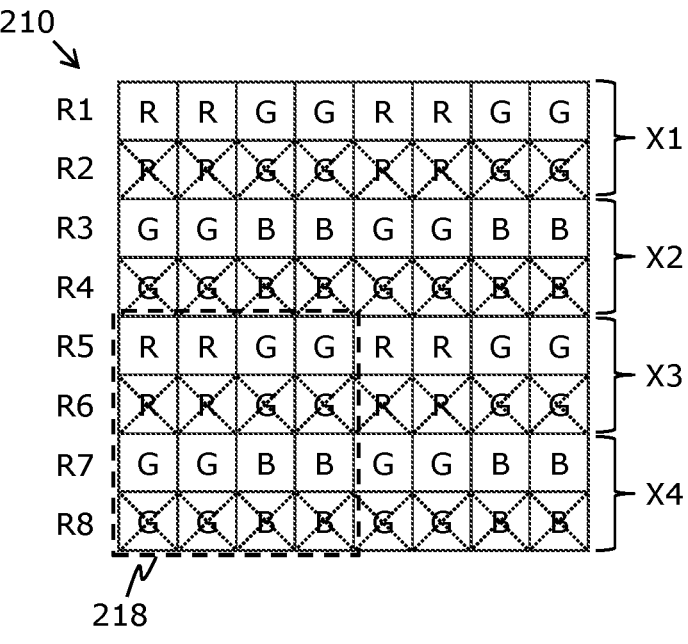
FIG. 2B illustrates an exemplary way of reading out image data from a region of a photo-sensitive surface of an image sensor, in accordance with an embodiment of the third aspect and a fourth aspect of the present disclosure.

Referring to FIG. 2B, illustrated is an exemplary way of reading out image data from a region of the photo-sensitive surface 208 of the image sensor 202, in accordance with an embodiment of the third aspect and the fourth aspect of the present disclosure. With reference to FIG. 2B, the shown part of the CFA 210 has 4 smallest repeating units arranged sequentially, and has 8 rows R1, R2, R3, R4, R5, R6, R7, and R8 of colour filters. Moreover, since the 4 smallest repeating units are arranged sequentially in the CFA 210, 4 sets X1, X2, X3, and X4 of repeating rows are shown to be formed in the CFA 210, wherein each of the sets X1-X4 comprises two rows that repeat consecutively. As shown, the set X1 comprises the rows R1 and R2, the set X2 comprises the rows R3 and R4, the set X3 comprises the rows R5 and R6, and the set X4 comprises the rows R7 and R8. In this regard, when performing the subsampling, the image data is read out from those photo-sensitive cells that correspond to one row out of the two rows in each of the sets X1-X4 using the at least two different settings for different colour filters in a given array of a same colour, and the image data is not read out from those photo-sensitive cells that correspond to a remaining row out of the two rows in each of the sets X1-X4. Thus, the image data can be read out from 32 photo-sensitive cells that correspond to the rows R1, R3, R5, and R7 in the shown part of the CFA 210 using the at least two different settings for the different colour filters in the given array of the same colour, while the image data is not read out from remaining 32 photo-sensitive cells (crossed out as dotted 'X's) that correspond to the rows R2, R4, R6, and R8 in the shown part of the CFA 210. In other words, 50 percent subsampling is performed in the shown part of the CFA 210. Notably, the subsampling is performed using at least two different settings pertaining to at least one of: an exposure time, a sensitivity, an aperture size, for different colour filters in a given array of a same colour. Thus, the (subsampled) image data is processed, using at least one neural network, to generate an HDR image.

It will be appreciated that when performing the subsampling, the image data may alternatively be read out from those photo-sensitive cells that correspond to any one column out of two columns in each set of repeating columns, wherein each set of the repeating columns comprises the two columns that repeat consecutively.

Figure 2C:
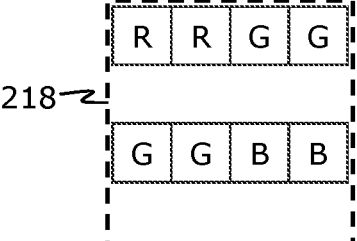
FIG. 2C illustrates is how the image data has been read out for a given smallest repeating unit, in accordance with an embodiment of the third aspect and the fourth aspect of the present disclosure.

Referring to FIG. 2C, illustrated is how the image data may be read out for the given smallest repeating unit 218, in accordance with an embodiment of the third aspect and the fourth aspect of the present disclosure. Only photo-sensitive cells that have been read out and their corresponding colour filters have been shown, while remaining photo-sensitive cells (that have been skipped) have been depicted as white spaces in the given smallest repeating unit 218, for the sake of clarity.

In this regard, out of a total of 16 photo-sensitive cells in the given smallest repeating unit 218, the image data has been read out from 8 photo-sensitive cells. In the shown example, two photo-sensitive cells have been read out corresponding to each array of colour filters of a same colour, namely, corresponding to 2 red colour filters (out of the 2×2 array of red colour filters), 2 blue colour filters (out of the 2×2 array of blue colour filters), 2 green colour filters (out of one 2×2 array of green colour filters), and 2 green colour filters (out of another 2×2 array of green colour filters). In each of these arrays, the two photo-sensitive cells are read out, using the at least two different settings (as shown later with reference to FIG. 2D).

FIGS. 2B and 2C are merely examples, which should not unduly limit the scope of the claims herein. The person skilled in the art will recognize many variations, alternatives, and modifications of embodiments of the present disclosure.

Optionally, the at least two different settings comprises at least one first setting and at least one second setting, wherein an order in which the at least one first setting and the at least one second setting are used for different colour filters in a given array of a same colour is different from an order in which the at least one first setting and the at least one second setting are used for different colour filters in a neighbouring array of the same colour.

In this regard, since the image data is read out from photo-sensitive cells that correspond to some rows or columns of the colour filters in the CFA, and the image data is not read out (i.e., skipped) from photo-sensitive cells that correspond to remaining rows or columns of the colour filters in the CFA (as discussed earlier), there could be a scenario that when reading out the image data, the at least one processor utilises a same order of the at least two different settings for at least two consecutive rows or columns of the colour filters. In such a scenario, the HDR image (that is generated upon processing the image data) may not have a highly accurate and realistic visual quality, for example, such as in terms of a uniform colour reproduction. Therefore, in order to mitigate such a potential problem, different orders of the at least one first setting and the at least one second setting are utilised by the at least one processor when reading out the image data from the given array of the same colour and the neighbouring array of the same colour, as described hereinabove. The technical benefit of utilising such different orders is that it facilitates in generating the HDR image that have highly realistic visual quality, for example, such as in terms of an improved uniform colour reproduction throughout its field of view.

It will be appreciated that more than one first setting and more than one second setting could be used when reading out the image data corresponding to different colour filters in any array of a same colour (namely, the given array of the same colour and/or the neighbouring array of the same colour). For example, the at least one first setting may pertain to more than one large aperture size, and the at least one second setting may pertain to more than one small aperture size. It will be appreciated that any one of: the more than one large aperture size, the more than one small aperture size, may even comprise at least one medium aperture size. Examples of large aperture sizes, small aperture sizes, and medium aperture sizes have already been discussed earlier with respect to the aforementioned first aspect.

Figure 2D:
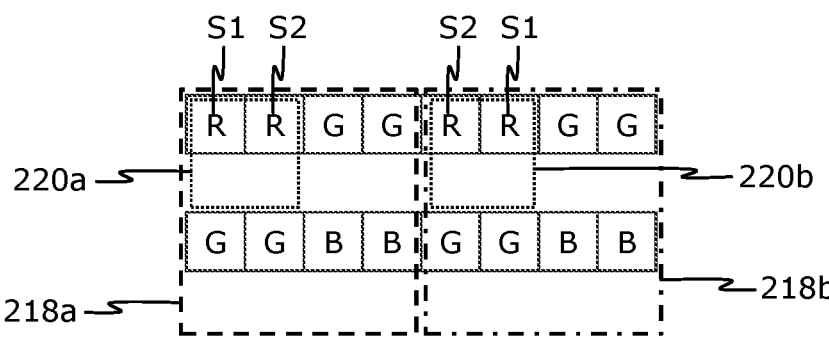
FIG. 2D illustrates an exemplary way of how different orders of a first setting and a second setting are used, when performing subsampling, in accordance with an embodiment of the third aspect and the fourth aspect of the present disclosure.

Referring to FIG. 2D, illustrated is an exemplary way of how different orders of a first setting S1 and a second setting S2 are used, when performing subsampling, in accordance with an embodiment of the third aspect and the fourth aspect of the present disclosure. Herein, the first setting S1 and the second setting S2 are different from each other, and pertain to at least one of: different exposure times, different sensitivities, different aperture sizes. With reference to FIG. 2D, it is shown that how the image data from two neighbouring smallest repeating units (namely, a given smallest repeating unit 218a and another given smallest repeating unit 218b (depicted using a dash-dot line box) is read out using different orders. As shown, for a given 2×2 array 220a (depicted using a dotted line box) of red colour filters in the given smallest repeating unit 218a, (upper) two photo-sensitive cells are read out, in a manner that a first photo-sensitive cell corresponding to a first red colour filter and a second photo-sensitive cell corresponding to a second red colour filter are read out using the first setting S1 and the second setting S2, respectively. However, for a neighbouring 2×2 array 220b (depicted using a dotted line box) of red colour filters in the another given smallest repeating unit 218b, (upper) two photo-sensitive cells are read out, in a manner that a first photo-sensitive cell corresponding to a first red colour filter and a second photo-sensitive cell corresponding to a second red colour filter are read out using the second setting S2 and the first setting S1, respectively.

FIG. 2D is merely an example, which should not unduly limit the scope of the claims herein. The person skilled in the art will recognize many variations, alternatives, and modifications of embodiments of the present disclosure.

Optionally, when reading out, the at least one processor is configured to bin at least two photo-sensitive cells that correspond to colour filters of a same colour in a given array and for which a same setting is used. In this regard, the at least two photo-sensitive cells (corresponding to the colour filters of the same colour and for which the same setting is used) are binned (namely, combined) together to form a single super photo-sensitive cell. Beneficially, this enables in reducing a noise in a corresponding region of the HDR image (that is generated upon processing the image data), for example, due to averaging. Moreover, this may also facilitate in reducing an overall time for reading out the image data by the image sensor, and in increasing a frame rate of generating/displaying images. When binning is performed for the at least two photo-sensitive cells (that correspond to the colour filters of the same colour and for which the same setting is used), the single super photo-sensitive cell may have a defined and a highly accurate colour range in the corresponding region of the HDR image, thereby potentially improving colour reproduction thereat. It will be appreciated that the aforesaid binning of the at least two photo-sensitive cells could be an analog binning, i.e., binning that is performed at a time of reading out the image data from the image sensor. Binning process and its techniques/algorithms are well-known in the art.

Figure 2E:
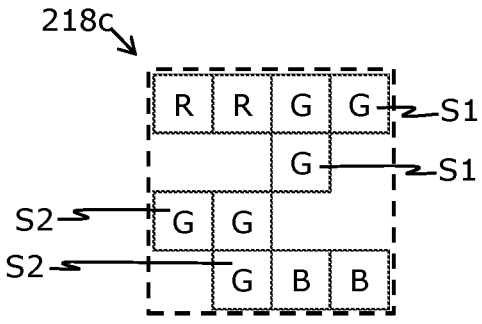
FIG. 2E illustrates an exemplary scenario of binning at least two photo-sensitive cells when reading out the image data from the image sensor, in accordance with an embodiment of the third aspect and the fourth aspect of the present disclosure.

Referring to FIG. 2E, illustrated is an exemplary scenario of binning at least two photo-sensitive cells when reading out the image data from the image sensor 202, in accordance with an embodiment of the third aspect and the fourth aspect of the present disclosure. With reference to FIG. 2E, it is shown that how the image data from a smallest repeating unit 218c (depicted using a dashed line box) in the CFA 210 is read out using two different settings, namely, a first setting S1 and a second setting S2. Out of 16 photo-sensitive cells, the image data has been read out from 10 photo-sensitive cells. As shown, two photo-sensitive cells that correspond to respective ones of two green colour filters and for which the (same) first setting S1 is used, are binned together to form a single super photo-sensitive cell. Similarly, another two photo-sensitive cells that correspond to respective ones of another two green colour filters and for which the (same) second setting S2 is used, are binned together to form another single super photo-sensitive cell.

FIG. 2E is merely an example, which should not unduly limit the scope of the claims herein. The person skilled in the art will recognize many variations, alternatives, and modifications of embodiments of the present disclosure.

The present disclosure also relates to the method of the fourth aspect as described above. Various embodiments and variants disclosed above, with respect to the aforementioned third aspect, apply mutatis mutandis to the method of the fourth aspect.

Optionally, in the method, the at least two different settings comprises at least one first setting and at least one second setting, wherein an order in which the at least one first setting and the at least one second setting are used for different colour filters in a given array of a same colour is different from an order in which the at least one first setting and the at least one second setting are used for different colour filters in a neighbouring array of the same colour.

Optionally, in the method, wherein the step of reading out further comprises binning at least two photo-sensitive cells that correspond to colour filters of a same colour in a given array and for which a same setting is used.

Fifth Aspect and Sixth Aspect

In a fifth aspect, an embodiment of the present disclosure provides an imaging system comprising:

> an image sensor chip comprising:
>> a colour filter array comprising a plurality of smallest repeating units, wherein a given smallest repeating unit comprises colour filters of at least three different colours; and
>> a plurality of photo-sensitive cells arranged on a photo-sensitive surface of the image sensor chip, wherein the photo-sensitive surface has gaps between consecutive rows or columns of smallest repeating units, a size of a given gap lies in a range of 0.25 times to 2 times a width of the given smallest repeating unit; and
> at least one processor configured to:
>> read out image data from the image sensor chip; and
>> process the image data, using at least one neural network, to generate an image.

In a sixth aspect, an embodiment of the present disclosure provides a method comprising:

> reading out image data from an image sensor chip, wherein the image sensor chip comprises a colour filter array comprising a plurality of smallest repeating units, wherein a given smallest repeating unit comprises colour filters of at least three different colours, and a plurality of photo-sensitive cells arranged on a photo-sensitive surface of the image sensor chip, wherein the photo-sensitive surface has gaps between consecutive rows or columns of smallest repeating units, a size of a given gap lies in a range of 0.25 times to 2 times a width of the given smallest repeating unit; and
> processing the image data, using at least one neural network, for generating an image.

The present disclosure provides the aforementioned imaging system and the aforementioned method incorporating read out of the image data from the photo-sensitive surface having the gaps, to generate high-quality, realistic images at a high framerate, in computationally-efficient and time-efficient manner. Beneficially, when the image data is read out from the photo-sensitive surface that has the gaps, an overall amount of the image data and a processing time for reading out the image data are considerably lesser, as compared to an amount of the image data and a processing time for reading out the image data from all photo-sensitive cells of a typical photo-sensitive surface that does not have any gaps. In addition to this, reading out (and processing) the image data from the consecutive rows and/or columns of smallest repeating units enables in achieving a high visual quality (for example, in terms of a native resolution, a high contrast, a realistic and accurate colour reproduction, and the like) in corresponding pixels of the image (that is generated upon processing the image data, as discussed later). This is because the colour filters of the at least three different colours facilitates in providing better colour reproduction and resolution in the corresponding pixels of the image. Moreover, reading out from such an image sensor is similar to a selective read out (namely, subsampling) of the image data from a typical photo-sensitive surface that does not have any gaps. This facilitates in providing a high frame rate of images, whilst reducing computational burden, delays, and excessive power consumption. Furthermore, another potential technical benefit of employing the aforesaid image sensor chip for reading out the image data is that analog-to-digital conversion (ADC) associated with the aforesaid image sensor chip would exhibit a reduced capacitive load (for example, by 50 percent of a typical capacitive load), thereby resulting in lower power consumption and minimum noise in generated images. This, in turn, contributes to a higher ADC speed, thereby further enhancing the frame rate of generating the images. Additionally, an implementation of a simpler ADC design facilitates a smaller silicon size for making the aforesaid image sensor chip. As a result, the imaging system and the method are susceptible to cope with visual quality requirements, for example, such as a high resolution (such as a resolution higher than or equal to 60 pixels per degree), a small pixel size, and a large field of view, whilst achieving a high (and controlled) frame rate (such as a frame rate higher than or equal to 90 FPS). The imaging system and the method are simple, robust, fast, reliable, and can be implemented with ease.

There will now be provided details of various operations as described earlier with respect to the aforementioned fifth aspect. It is to be understood that some common details of the aforementioned fifth aspect have already been described earlier with respect to the aforementioned first aspect and/or the aforementioned third aspect, and have not been described again, for sake of brevity and avoiding repetition.

In some implementations, the colour filters of the at least three different colours comprise at least one blue colour filter, at least one green colour filter, and at least one red colour filter. In some examples, the at least one green colour filter could comprise at least two green colour filters. It will be appreciated that the colour filters of the at least three different colours in the given smallest repeating unit may be selected in a manner that the colour filter array (CFA) is implemented as any one of: a typical Bayer CFA, an X-Trans CFA, a 4C Bayer CFA, a 9C Bayer CFA, a 16C Bayer CFA. All the aforesaid implementations of the CFA are well-known in the art, and have been discussed earlier with respect to the aforementioned first aspect and the aforementioned third aspect.

In other implementations, the colour filters of the at least three different colours comprise at least one cyan colour filter, at least one magenta colour filter, and at least one yellow colour filter. In some examples, the at least one magenta colour filter could comprise at least two magenta colour filters.

Optionally, the given smallest repeating unit further comprises at least one other colour filter, in addition to the colour filters of the at least three different colours, wherein the at least one other colour filter allows to pass through at least three wavelengths corresponding to respective ones of the at least three different colours. It will be appreciated that the at least one other colour filter that allows to pass through the at least three wavelengths simultaneously, can be understood to be a white colour filter or a near-white colour filter.

Notably, the plurality of photo-sensitive cells are arranged on the photo-sensitive surface in a discontinuous manner such that the photo-sensitive surface has no photo-sensitive cells in the gaps between the consecutive rows or columns of the smallest repeating units. It is to be understood that since there would not be any photo-sensitive cells in the gaps, silicon is not required to be utilised in said gaps. Optionally, the size of the given gap lies in a range of 0.75 times to 1.25 times a width of the given smallest repeating unit. It will be appreciated that the size of the given gap may vary or may remain same across the photo-sensitive surface. In other words, there could be different sizes of gaps between the consecutive rows or columns of the smallest repeating units (i.e., the gaps are present in a non-uniform, unequal manner across the photo-sensitive surface), or there could be a same size of gaps between the consecutive rows or columns of the smallest repeating units (i.e., the gaps are present in a uniform, equi-spaced manner across the photo-sensitive surface). This has been also illustrated in conjunction with FIGS. 3A and 3B, for sake of better understanding and clarity. Optionally, the photo-sensitive surface has gaps between both consecutive rows and consecutive columns of the smallest repeating units. Optionally, in this regard, a size of a given gap between the consecutive rows is same as or is different from a size of another given gap between the consecutive columns. This has been also illustrated in conjunction with FIG. 3C, for sake of better understanding and clarity. It will also be appreciated that since there would not be any photo-sensitive cells present in the gaps, the colour filter array may be modified accordingly to conform to how the plurality of photo-sensitive cells have been arranged on the photo-sensitive surface. This is because employing colour filters corresponding to the gaps where no photo-sensitive cells are present, would not be useful anyway. However, the colour filter array may also be used without any modification.

In an example, for a typical Bayer CFA, the given smallest repeating unit may be a 2×2 array comprising one red colour filter, one blue colour filter, and two green colour filters. In such a case, there would be gaps between consecutive rows of smallest repeating units of the typical Bayer CFA. The size of said gaps may, for example, be equal to a width of the given smallest repeating unit.

The at least one processor controls an overall operation of the imaging system of the aforementioned fifth aspect. The at least one processor is communicably coupled to at least the image sensor chip. Optionally, the at least one processor is implemented as an image signal processor. In an example, the image signal processor may be a programmable digital signal processor (DSP).

Notably, since the photo-sensitive surface has the gaps between the consecutive rows or columns of the smallest repeating units, when the at least one processor reads out the image data from the image sensor chip, the image data is (automatically) obtained as subsampled image data. In some implementations, when the gaps are present between the consecutive rows, the image data is read out in a manner that is similar to how subsampling is performed in a row-wise manner. In other implementations, when the gaps are present between the consecutive columns, the image data is read out in a manner that is similar to how subsampling is performed in a column-wise manner. In yet other implementations, when the gaps are present between both the consecutive rows and the consecutive columns, the image data is read out in a manner that is similar to how subsampling is performed as a combination of a row-wise manner and a column-wise manner.

In particular, the at least one processor reads out the image data from all those photo-sensitive cells that belong the consecutive rows and/or columns, and the image data is not read out (namely, is skipped anyway) from the gaps where no photo-sensitive cells are present. It will be appreciated that when processing the image data, in order to generate the image, the at least one processor used the at least one neural network to generate image data corresponding to locations of the gaps where no photo-sensitive cells are present, by utilising the image data that is read out from said photo-sensitive cells that belong the consecutive rows and/or columns. Notably, the image data is processed to generate the image in a similar manner as discussed earlier in detail, with respect to the aforementioned first aspect.

Figure 3A:
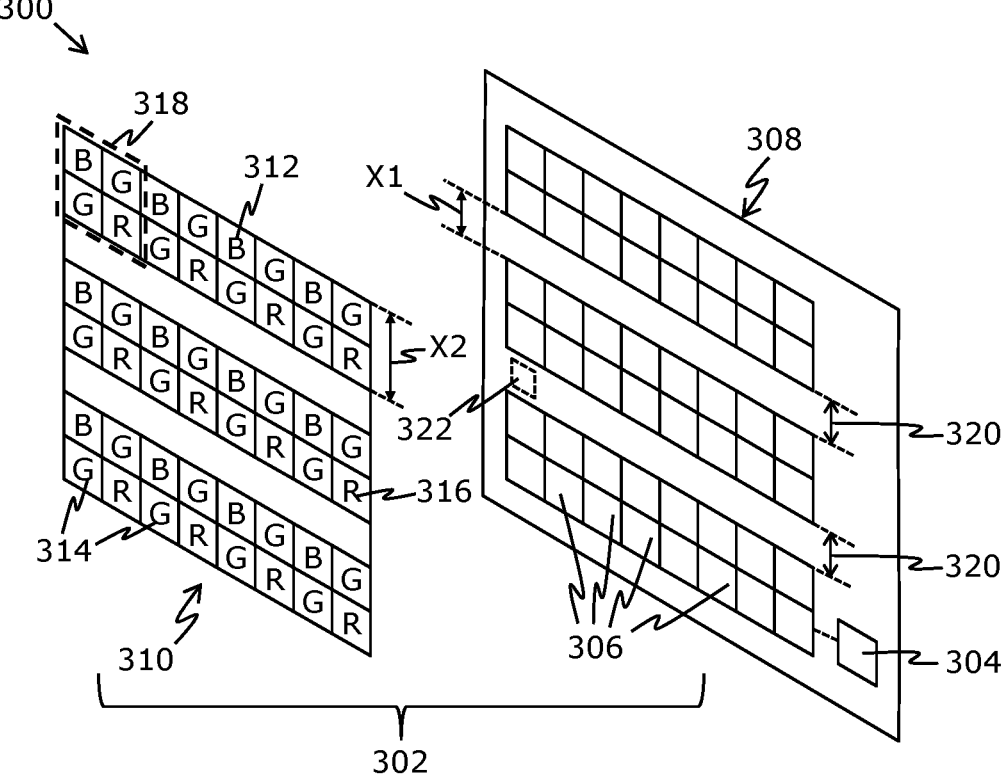
FIG. 3A illustrates a simplified example implementation of an imaging system, in accordance with a fifth aspect of the present disclosure.

Referring to FIG. 3A, illustrated is a simplified example implementation of an imaging system 300, in accordance with the fifth aspect of the present disclosure. The simplified example implementation has been shown as an exploded view in FIG. 3A. The imaging system 300 comprises an image sensor chip 302 and at least one processor (depicted as a processor 304). The image sensor chip 302 comprises a plurality of photo-sensitive cells 306 arranged on a photo-sensitive surface 308, and a colour filter array (CFA) 310. Optionally, the processor 304 is integrated into the image sensor chip 302. The processor 304 is communicably coupled to the plurality of photo-sensitive cells 306. For sake of simplicity and clarity, a portion of the CFA 310 is shown corresponding to a portion of the photo-sensitive surface 308. In the shown portion of the CFA 310, "B" refers to blue colour filters 312, "G" refers to green colour filters 314, and "R" refers to red colour filters 316. Said portion of the photo-sensitive surface 308 comprises 48 photo-sensitive cells, and colour filters in the shown portion of the CFA 310 are arranged in front of respective ones of the 48 photo-sensitive cells. The CFA 310 comprises a plurality of smallest repeating units, wherein a given smallest repeating unit 318 (depicted as a 2×2 array of colour filters, using a dashed line box) is repeated throughout the CFA 310. With reference to FIG. 3A, the given smallest repeating unit 318 comprises two green colour filters 314, one red colour filter 316, and one blue colour filter 312, and the CFA 310 has been shown as a typical Bayer CFA, for illustration purposes only. The shown portion of the CFA 310 comprises 48 colour filters. It will be appreciated that a photo-sensitive surface of a typical image sensor has millions of photosensitive cells (namely, pixels).

In FIG. 3A, the photo-sensitive surface 308 is shown to have equi-sized gaps (depicted as gaps 320) between consecutive rows of smallest repeating units. A size X1 of the gaps 320 may, for example, be 0.5 times a width X2 of the given smallest repeating unit 318, as shown in FIG. 3A. Moreover, in the shown example implementation of the imaging system 300, since the gaps 320 are present between the consecutive rows, image data is read out (by the processor 304) from the photo-sensitive cells 306 in a manner that is similar to how subsampling is performed in a row-wise manner. Optionally, the imaging system 300 further comprises a reading circuitry 322 that is arranged on the gaps 320.

It may be understood by a person skilled in the art that FIG. 3A includes a simplified example implementation of the imaging system 300, for sake of clarity, which should not unduly limit the scope of the claims herein. It is to be understood that the specific implementation of the imaging system 300 is not to be construed as limiting it to specific numbers or types of image sensor chips, processors, photo-sensitive cells, gaps, colour filters, and colour filter arrays. The person skilled in the art will recognize many variations, alternatives, and modifications of embodiments of the present disclosure.

Figure 3B:
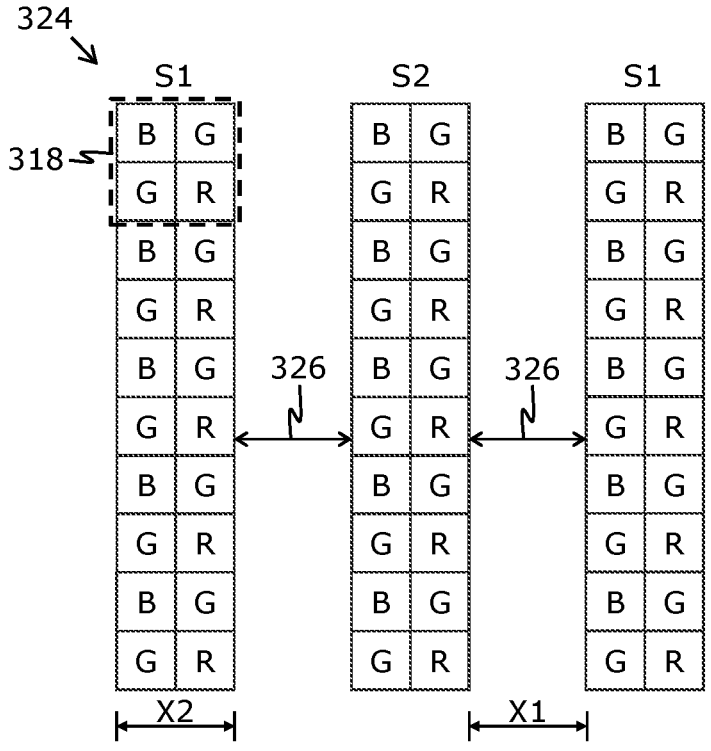
FIGS. 3B and 3C illustrate different exemplary ways of reading out image data from an image sensor chip, in accordance with different embodiments of the fifth aspect and a sixth aspect of the present disclosure.
Figure 3C:
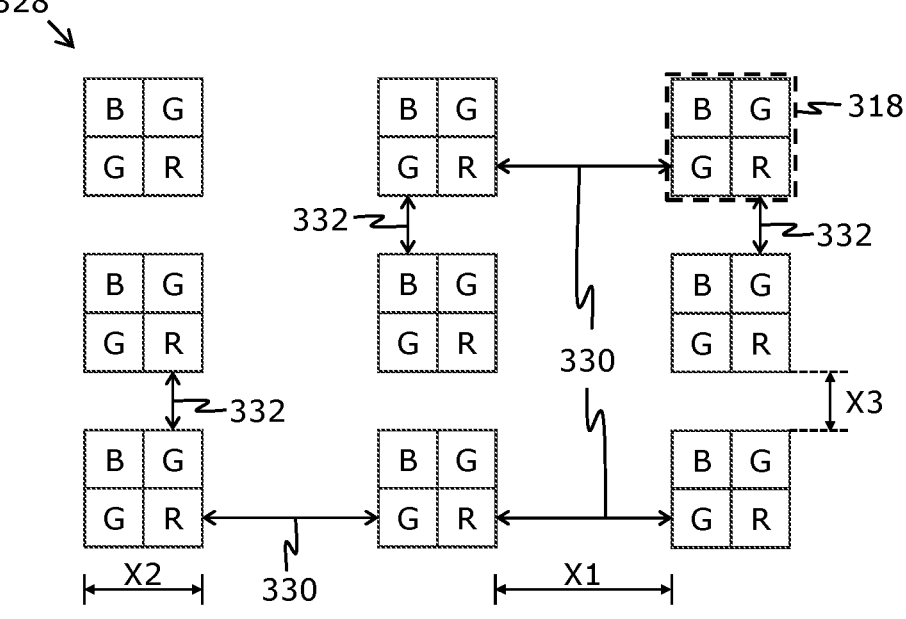

Referring to FIGS. 3B and 3C, illustrated are different exemplary ways of reading out image data from an image sensor chip, in accordance with different embodiments of the fifth aspect and the sixth aspect of the present disclosure. With reference to FIG. 3B, for sake of simplicity and clarity, there is shown a combined view of a portion of a CFA 324 arranged on an optical path of a portion of a photo-sensitive surface of the image sensor chip. Said portion of the photo-sensitive surface comprises 60 photo-sensitive cells, and colour filters in the portion of the CFA 324 are arranged in front of respective ones of the 60 photo-sensitive cells. The CFA 324 comprises a plurality of smallest repeating units, wherein a given smallest repeating unit 318 is repeated throughout the CFA 324. The photo-sensitive surface has equi-sized gaps 326 between consecutive columns of smallest repeating units. A size X1 of the gaps 326 may, for example, be same as (namely, 1 times) the width X2 of the given smallest repeating unit 318, as shown in FIG. 3B. Moreover, since the gaps 326 are present between the consecutive columns of smallest repeating units, image data is read out (for example, by the processor 304) from the 60 photo-sensitive cells in a manner that is similar to how subsampling is performed in a column-wise manner.

With reference to FIG. 3C, for sake of simplicity and clarity, there is shown a combined view of a portion of a CFA 328 arranged in front of a portion of a photo-sensitive surface of the image sensor chip. Said portion of the photo-sensitive surface comprises 36 photo-sensitive cells, and colour filters in the portion of the CFA 328 are arranged in front of respective ones of the 36 photo-sensitive cells. The CFA 328 comprises a plurality of smallest repeating units, wherein the given smallest repeating unit 318 is repeated throughout the CFA 328. The photo-sensitive surface has equi-sized gaps 330 between consecutive columns of smallest repeating units, and has equi-sized gaps 332 between consecutive rows of smallest repeating units. A size X1 of the gaps 330 may, for example, be 1.25 times the width X2 of the given smallest repeating unit 318. A size X3 of the gaps 332 may, for example, be 0.5 times the width X2 of the given smallest repeating unit 318. Moreover, since the gaps 330 are present between the consecutive columns and the gaps 332 are present between the consecutive rows, image data is read out (for example, by the processor 304) from the 36 photo-sensitive cells in a manner that is similar to how subsampling is performed as a combination of a column-wise manner and a row-wise manner.

FIGS. 3B and 3C are merely examples, which should not unduly limit the scope of the claims herein. The person skilled in the art will recognize many variations, alternatives, and modifications of embodiments of the present disclosure.

Optionally, the at least one processor is integrated into the image sensor chip. The technical benefit of such an integration is that the at least one neural network (that is used by the at least one processor) resides on (namely, is hosted on) the image sensor chip. Moreover, this may enable in an improved real-time processing of the image data, for generating images in real time or near-real time. Moreover, said integration may also reduce a necessity for data transfer to external processing units, thereby allowing for sophisticated on-chip image processing capabilities.

Optionally, the generated image is in a RAW image format. The technical benefit of this is that the RAW image format requires a lesser amount of data as compared to full RGB data. Moreover, the RAW image format comprises minimally-processed image data without any compression or in-camera processing. Thus, it enables in preserving a higher level of detail, which could be beneficial during post-processing of the generated image. Typically, images in the RAW image format allow for enhanced adjustments in terms of exposure, white balance, colour grading, and the like. Additionally, an absence of the in-camera processing ensures that the (original) image data is retained in the generated image, thereby preventing a loss of visual information that often occurs in compressed formats, for example, such as Joint Photographic Experts Group (JPEG).

Optionally, the imaging system further comprises a reading circuitry that is employed to read out the image data from the plurality of photo-sensitive cells, the reading circuitry being arranged on the gaps. The term "reading circuitry" refers to an electronic circuit that is capable of reading out the image data from the plurality of photo-sensitive cells. The reading circuitry may be responsible for converting analog signals generated by the plurality of photo-sensitive cells in response to incident light into digital signals that could be further processed, for generating images. This reading circuitry may comprise elements, for example, such as analog-to-digital converters (ADCs), amplifiers, and the like. The technical benefit of implementing the reading circuitry on the gaps is that the gaps in the photo-sensitive surface could be beneficial utilised, and thus an overall size of the image sensor chip may be reduced.

Optionally, when reading out, the at least one processor is configured to use at least two different settings pertaining to at least one of: an exposure time, a sensitivity, an aperture size for any one of:

(i) different colour filters in a given array of a same colour, wherein a given smallest repeating unit of the colour filter array comprises one array of red colour filters, one array of blue colour filters and two arrays of green colour filters, (ii) a first sub-set of sequences and a second sub-set of sequences, the sequences of the first sub-set and the sequences of the second sub-set being arranged in an alternating manner, a given sequence being a row or a column of smallest repeating units in the colour filter array, a given smallest repeating unit comprising at least one red colour filter, at least one blue colour filter and at least two green colour filters.

In this regard, the image data is read out using the at least two different settings i.e., using at least one of: different exposure times, different sensitivities, different aperture sizes. The technical benefit of using the at least two different settings for reading out the (subsampled) image data is that it facilitates in generating HDR images, without reducing any frame rate (i.e., there would not be any frame rate drop). Optionally, when processing the image data that is read out using the at least two different settings for any one of case (i) and case (ii), the at least one neural network performs at least one operation on said image data, that provide a result that is similar to applying at least one HDR imaging technique. It is to be noted that the image data is read out using the at least two different settings for the case (i) in a similar manner, as discussed earlier in detail with respect to the aforementioned third aspect. Furthermore, the image data is read out using the at least two different settings for the case (ii) in a similar manner, as discussed earlier in detail with respect to the aforementioned first aspect.

Referring again to FIG. 3B, "S1" refers to a first setting and "S2" refers to a second setting, wherein the first setting S1 and the second setting S2 are different from each other, and pertain to at least one of: different exposure times, different sensitivities, different aperture sizes. With reference to FIG. 3B, the image data is read out from 20 photo-sensitive cells that correspond to a first column of the smallest repeating units, using the first setting S1. The image data is read out from another 20 photo-sensitive cells that correspond to a second column of the smallest repeating units, using the second setting S2. The image data is read out from yet another 20 photo-sensitive cells that correspond to a third column of the smallest repeating units, using the second setting S1. The image data corresponding to all the aforesaid columns may then be processed to generate an HDR image.

The present disclosure also relates to the method of the sixth aspect as described above. Various embodiments and variants disclosed above, with respect to the aforementioned fifth aspect, apply mutatis mutandis to the method of the sixth aspect.

Optionally, in the method, at least one processor (configured to perform the steps of reading out and processing) is integrated into the image sensor chip. The technical benefit of such an integration is that the at least one neural network (that is used by the at least one processor) resides on (namely, is hosted on) the image sensor chip.

Optionally, in the method, the generated image is in a RAW image format.

Optionally, in the method, a reading circuitry that is employed for reading out the image data from the plurality of photo-sensitive cells is arranged on the gaps.

Optionally, in the method, the step of reading out further comprises using at least two different settings pertaining to at least one of: an exposure time, a sensitivity, an aperture size for any one of:

(i) different colour filters in a given array of a same colour, wherein a given smallest repeating unit of the colour filter array comprises one array of red colour filters, one array of blue colour filters and two arrays of green colour filters, (ii) a first sub-set of sequences and a second sub-set of sequences, the sequences of the first sub-set and the sequences of the second sub-set being arranged in an alternating manner, a given sequence being a row or a column of smallest repeating units in the colour filter array, a given smallest repeating unit comprising at least one red colour filter, at least one blue colour filter and at least two green colour filters.

Seventh Aspect and Eighth Aspect

In a seventh aspect, an embodiment of the present disclosure provides an imaging system comprising:

an image sensor chip comprising:

a plurality of neuromorphic sensors arranged in at least 50 percent of rows and/or columns of a photo-sensitive surface of the image sensor chip;

a plurality of photo-sensitive cells arranged in a remaining portion of the photo-sensitive surface; and a colour filter array arranged on an optical path of the plurality of photo-sensitive cells, the colour filter array comprising colour filters of at least three different colours; and at least one processor configured to:

read out event data from the plurality of neuromorphic sensors over a given time period;

read out, from the plurality of photo-sensitive cells, image data corresponding to a plurality of frames over the given time period; and process the event data and the image data, using at least one neural network, to generate at least one image.

In an eighth aspect, an embodiment of the present disclosure provides a method comprising:

reading out event data from a plurality of neuromorphic sensors of an image sensor chip over a given time period, wherein the plurality of neuromorphic sensors are arranged in at least 50 percent of rows and/or columns of a photo-sensitive surface of the image sensor chip;

reading out, from a plurality of photo-sensitive cells of the image sensor chip, image data corresponding to a plurality of frames over the given time period, wherein the plurality of photo-sensitive cells are arranged in a remaining portion of the photo-sensitive surface, and a colour filter array of the image sensor chip is arranged on an optical path of the plurality of photo-sensitive cells, the colour filter array comprising colour filters of at least three different colours; and processing the event data and the image data, using at least one neural network, for generating at least one image.

The present disclosure provides the aforementioned imaging system and the aforementioned method incorporating read out of the event data and the image data from the photo-sensitive surface, to generate high-quality, realistic image(s) at a high framerate, in computationally-efficient and time-efficient manner. Herein, when the event data is detected, it indicates occurrence of an event, and thus the event data is processed together with the image data to generate the at least one image. Moreover, the image data is (automatically) obtained as subsampled image data, and thus a selective read out of the image data facilitates in providing a high frame rate of images, whilst reducing computational burden, delays, and excessive power consumption. Furthermore, when processing, the at least one neural network utilises the event data to perform motion deblurring in the image data and to improve colour reproduction in the image data. Beneficially, the at least one image generated would have motion deblurred, and also has a high visual quality (for example, in terms of a native resolution, a high contrast, a realistic and accurate colour reproduction, and the like). The event data may also be utilised to enable hand tracking of a user present in a real-world environment. The imaging system and the method are susceptible to cope with visual quality requirements, for example, such as a high resolution (such as a resolution higher than or equal to 60 pixels per degree), a small pixel size, and a large field of view, whilst achieving a high (and controlled) frame rate (such as a frame rate higher than or equal to 90 FPS). The imaging system and the method are simple, robust, fast, reliable, and can be implemented with ease.

There will now be provided details of various operations as described earlier with respect to the aforementioned seventh aspect. It is to be understood that some common details of the aforementioned fifth aspect have already been described earlier with respect to at least one of: the aforementioned first aspect, the aforementioned third aspect, the aforementioned fifth aspect, and have not been described again, for sake of brevity and avoiding repetition.

Notably, the at least one processor controls an overall operation of the imaging system of the aforementioned seventh aspect. The at least one processor is communicably coupled to at least the image sensor chip. Optionally, the at least one processor is implemented as an image signal processor. In an example, the image signal processor may be a programmable digital signal processor (DSP). Optionally, the at least one processor is integrated into the image sensor chip.

Throughout the present disclosure, the term "neuromorphic sensor" refers to a sensor that is capable of detecting occurrences of events (namely, changes) in a real-world environment (specifically, a dynamic real-world environment). An event could, for example, be a change in a light intensity in the real-world environment, a change in a contrast, a motion of an object (or its part) present in the real-world environment, a motion of a human (or a body part of the human) in the real-world environment, removal of an existing object (or its part) from the real-world environment, addition of a new object (or its part) in the real-world environment, and the like.

It will be appreciated that occurrence of an event can be detected by reading out the event data using the plurality of neuromorphic sensors over the given time period, and then analysing the event data. When a change (i.e., an event) has not been occurred in the real-world environment, the event data may comprise reference sensor values pertaining to, for example, the light intensity, and any change is said to have occurred, only when said reference sensor values may exceed at least one predefined threshold. Thus, such reference sensor values would be modified accordingly, indicating that the change has been occurred. Then, these modified reference sensor values in the event data may be served as a basis/reference for a subsequent change that would occur in the real-world environment over another given time period. Optionally, the event data comprises sensor values indicative of at least one of: a change in the light intensity, a change in the motion of the object (or its part), a change in the motion of the human (or a body part of the human).

Typically, the neuromorphic sensors may also be referred to as event pixels. Moreover, a size of a typical neuromorphic sensor is greater than a size of a typical photo-sensitive cell (for example, such as one micron). It will be appreciated that that when large-sized neuromorphic sensors are utilised in the image sensor chip, a time for reading out and processing the event data can be potentially minimised. It is to be noted that the event data need not necessarily be read out with a higher resolution, as compared to how the image data is read out from the plurality of photo-sensitive cells.

Notably, the photo-sensitive surface has a minimum of 50 percent neuromorphic sensors arranged in the rows and/or the columns thereof. The plurality of photo-sensitive cells are arranged in the remaining portion of the photo-sensitive surface where the neuromorphic sensors are not arranged. It is to be understood that the colour filters of the colour filter array (CFA) are only arranged in front of respective ones of the plurality of photo-sensitive cells; and no colour filters in the CFA are arranged on an optical path of the plurality of neuromorphic sensors.

In some implementations, the colour filters of the at least three different colours comprise at least one blue colour filter, at least one green colour filter, and at least one red colour filter. In some examples, the at least one green colour filter could comprise at least two green colour filters. It will be appreciated that the colour filters of the at least three different colours in the given smallest repeating unit may be selected in a manner that the colour filter array (CFA) is implemented as any one of: a typical Bayer CFA, an X-Trans CFA, a 4C Bayer CFA, a 9C Bayer CFA, a 16C Bayer CFA. All the aforesaid implementations of the CFA are well-known in the art, and have been discussed earlier with respect to the aforementioned first aspect and the aforementioned third aspect. In an example implementation, the colour filter array could be a modified form of the 4C Bayer CFA, which accommodates neuromorphic sensors within smallest repeating units of the colour filter array. In such an implementation, a given smallest repeating unit could comprise one 1×2 array of red colour filters, one 1×2 array blue colour filters, two 2×2 arrays green colour filters, and well-defined spaces for accommodating two 1×2 arrays of neuromorphic sensors arranged on the photo-sensitive surface.

In other implementations, the colour filters of the at least three different colours comprise at least one cyan colour filter, at least one magenta colour filter, and at least one yellow colour filter. In some examples, the at least one magenta colour filter could comprise at least two magenta colour filters.

Optionally, the given smallest repeating unit further comprises at least one other colour filter, in addition to the colour filters of the at least three different colours, wherein the at least one other colour filter allows to pass through at least three wavelengths corresponding to respective ones of the at least three different colours. It will be appreciated that the at least one other colour filter that allows to pass through the at least three wavelengths simultaneously, can be understood to be a white colour filter or a near-white colour filter.

Notably, the image data corresponding to the plurality of frames is read out, whilst reading out the event data over the given time period (i.e., the event data and the image data are read out (and processed) simultaneously). When the event data is detected, it indicates occurrence of an event, and thus the event data is processed together with the image data to generate the at least one image, using the at least one neural network. Since the image data is read out from the plurality of photo-sensitive cells arranged only in the remaining portion, the image data is (automatically) obtained as sub-sampled image data. Depending on how the plurality of neuromorphic sensors are arranged in at least 50 percent of the rows and/or the columns of the photo-sensitive surface, the image data can be read out in a manner that is similar to how subsampling is performed in a row-wise manner, or in a column-wise manner, or as a combination of the row-wise manner and the column-wise manner. This has been also illustrated in conjunction with FIGS. 4B and 4C, for sake of better understanding and clarity.

Optionally, when processing the event data and the image data, an input of the at least one neural network comprises the event data and the (subsampled) image data, and an output of the at least one neural network comprises image data of pixels of the image. Information pertaining to processing of the image data using the at least one neural network has been discussed earlier in detail with respect to the aforementioned first aspect.

It will be appreciated that the event data may be processed by the at least one neural network in a similar manner in which the image data is processed. Optionally, when processing, the at least one neural network utilises the event data to perform motion deblurring in the image data and to improve colour reproduction in the image data (as the event pixels are sensitive to contrast changes). Therefore, benefi-cially, the at least one (generated) image would have motion deblurred (namely, any motion blur in the at least one image is corrected). The motion deblurring, and the motion blur and its types are well-known in the art. One such way of processing the event data using a neural network is described, for example, in "*Hybrid Deblur Net: Deep Non-Uniform Deblurring with Event Camera*" by L. Zhang et al., published in IEEE Access, vol. 8, pp. 148075-148083, 2020, which has been incorporated herein by reference. Moreover, the at least one neural network may also utilise the event data to enable hand tracking of a user present in the real-world environment, wherein the plurality of frames captured over the given time period represent at least one hand of the user. Such a hand tracking can be highly accurately performed using the (same) image sensor chip of the present disclosure, without requiring any separate sensors (for example, such as infrared (IR) sensors) for hand tracking. It will also be appreciated that when the image data is read out from the remaining portion of the photo-sensitive surface, an overall amount of the image data and a process-ing time for reading out the image data are considerably lesser, as compared to an amount of the image data and a processing time for reading out the image data from all photo-sensitive cells of a typical photo-sensitive surface. It will also be appreciated that such a selective read out of the image data facilitates in providing a high frame rate of images. Optionally, the at least one image is generated in a RAW image format. Optionally, the image sensor chip further comprises a reading circuitry for the plurality of neuromorphic sensors.

Figure 4A:
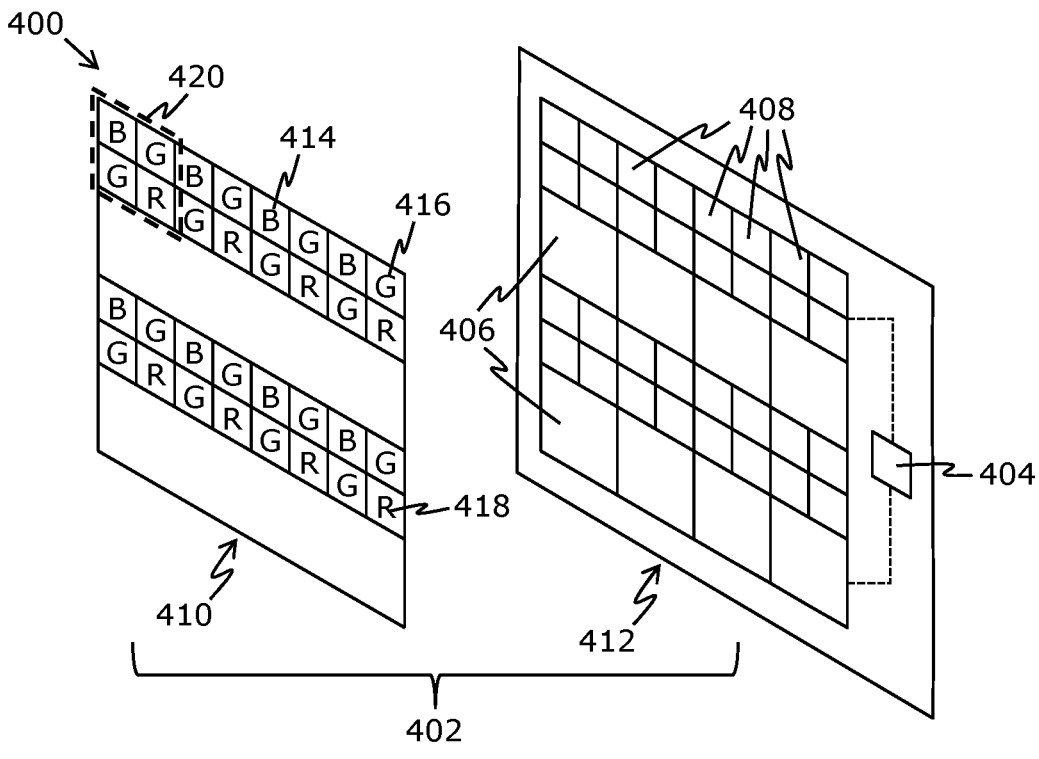
FIG. 4A illustrates a simplified example implementation of an imaging system, in accordance with a seventh aspect of the present disclosure.

Referring to FIG. 4A, illustrated is a simplified example implementation of an imaging system 400, in accordance with the seventh aspect of the present disclosure. The simplified example implementation is shown as an exploded view in FIG. 4A. The imaging system 400 comprises an image sensor chip 402 and at least one processor (depicted as a processor 404). The image sensor chip 402 comprises a plurality of neuromorphic sensors 406, a plurality of photo-sensitive cells 408, and a colour filter array (CFA) 410. The neuromorphic sensors 406 are shown to be arranged in 50 percent of rows of a photo-sensitive surface 412 of the image sensor chip 402. The photo-sensitive cells 408 are shown to be arranged in a remaining portion of the photo-sensitive surface 412. Optionally, the processor 404 is integrated into the image sensor chip 402. The processor 404 is communi-cably coupled to the neuromorphic sensors 406 and the photo-sensitive cells 406. For sake of simplicity and clarity, only a part of the photo-sensitive surface 412 is shown, said part comprising 8 neuromorphic sensors arranged in two rows out of four rows in said part of the photo-sensitive surface 412, each of the two rows having 4 neuromorphic sensors. Moreover, a portion of the CFA 410 is shown corresponding to the remaining portion of the photo-sensi-tive surface 412. In the shown portion of the CFA 410, "B" refers to blue colour filters 414, "G" refers to green colour filters 416, and "R" refers to red colour filters 418. The remaining portion of (said part of) the photo-sensitive sur-face 412 comprises 32 photo-sensitive cells (for sake of simplicity and clarity), and colour filters in the shown portion of the CFA 410 are arranged in an optical path of respective ones of the 32 photo-sensitive cells. The CFA 410 comprises a plurality of smallest repeating units, wherein a given smallest repeating unit 420 (depicted as a 2×2 array of colour filters, using a dashed line box) is repeated through-out the CFA 410. With reference to FIG. 4A, the given smallest repeating unit 420 comprises two green colour filters 416, one red colour filter 418, and one blue colour filter 414, and the CFA 410 is shown as a Bayer CFA, for illustration purposes only. The shown portion of the CFA 410 comprises 32 colour filters. It will be appreciated that a photo-sensitive surface of a typical image sensor has mil-lions of photosensitive cells (namely, pixels).

It may be understood by a person skilled in the art that FIG. 4A includes a simplified example implementation of the imaging system 400, for sake of clarity, which should not unduly limit the scope of the claims herein. It is to be understood that the specific implementation of the imaging system 400 is not to be construed as limiting it to specific numbers or types of image sensor chips, processors, photo-sensitive cells, neuromorphic sensors, colour filters, and colour filter arrays. The person skilled in the art will recognize many variations, alternatives, and modifications of embodiments of the present disclosure.

Figure 4B:
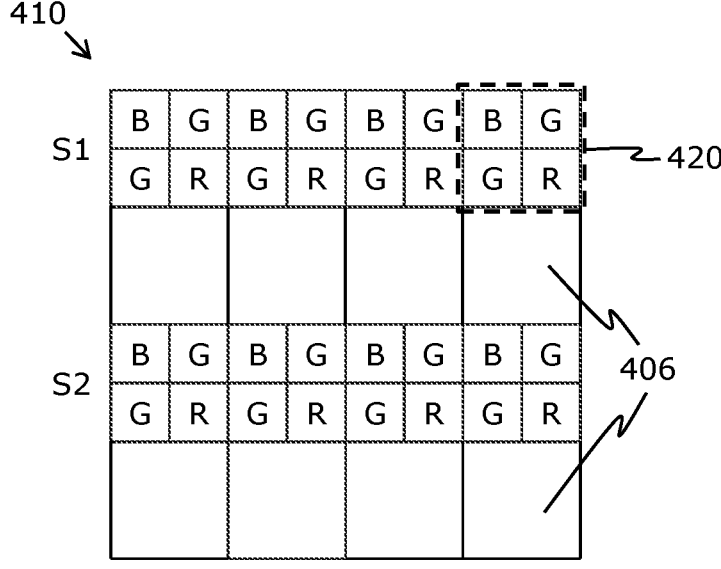
FIGS. 4B and 4C illustrates different exemplary ways of reading out image data and event data from a photo-sensitive surface of an image sensor chip, in accordance with different embodiments of the seventh aspect and an eighth aspect of the present disclosure.

Referring to FIG. 4B, illustrated is an exemplary way of reading out image data and event data from the photo-sensitive surface 412 of the image sensor chip 402, in accordance with an embodiment of the seventh aspect and the eighth aspect of the present disclosure. With reference to FIG. 4B, for sake of simplicity and clarity, there is shown a combined view of the portion of the CFA 410 arranged on the optical path of the photo-sensitive cells 408. As shown, the event data is read out from the 8 neuromorphic sensors 406 arranged in the two rows, each row having the 4 neuromorphic sensors. The event data is read out over a given time period. Simultaneously, the image data is read out from 16 photo-sensitive cells that correspond to a first row of smallest repeating units in the CFA 410, and from another 16 photo-sensitive cells that correspond to a second row of smallest repeating units in the CFA 410. The event data and the image data are processed, using at least one neural network, to generate at least one image.

Figure 4C:
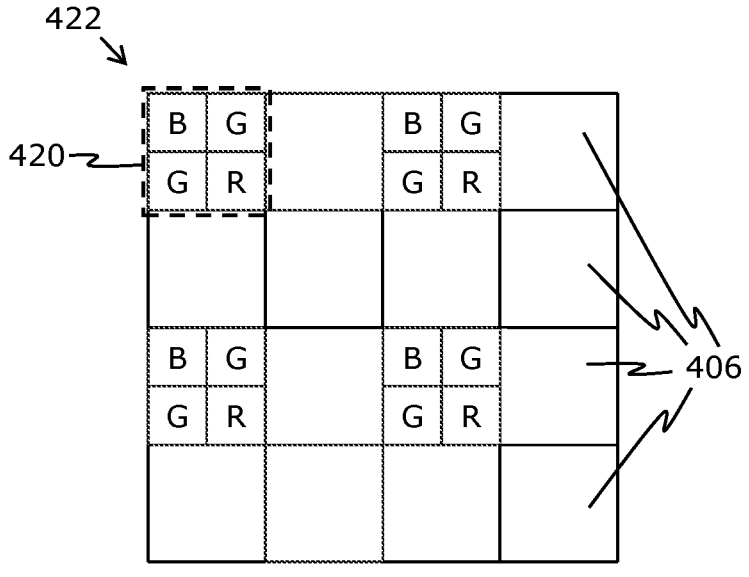

Referring to FIG. 4C, illustrated is another exemplary way of reading out image data and event data from a photo-sensitive surface of an image sensor chip, in accor-dance with another embodiment of the seventh aspect and the eighth aspect of the present disclosure. With reference to FIG. 4C, for sake of simplicity and clarity, there is shown a combined view of a portion of a CFA 422 arranged on an optical path of a plurality of photo-sensitive cells of the photo-sensitive surface. Herein, 12 neuromorphic sensors 406 are shown to be arranged in both rows and columns of the photo-sensitive surface; and 16 photo-sensitive cells are shown to be arranged in a remaining portion of the photo-sensitive surface. The shown portion of the CFA 422 comprises 4 smallest repeating units, wherein a given smallest repeating unit 420 is repeated throughout the CFA 422. As shown, the image data is read out from 8 photo-sensitive cells that correspond to a first row of smallest repeating units in the CFA 422, and another 8 photo-sensitive cells that correspond to a second row of smallest repeating units in the CFA 422. Simultaneously, the event data is read out from the 12 neuromorphic sensors 406 arranged alternatingly in two rows and two columns, each row and each column having 4 neuromorphic sensors. The event data and the image data are processed, using at least one neural network, to generate at least one image.

Figure 5A:
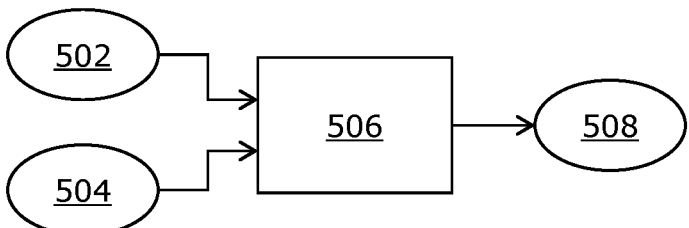
FIGS. 5A and 5B illustrate different exemplary sequence diagrams for generating at least one image, in accordance with different embodiments of the seventh aspect and the eighth aspect of the present disclosure.
Figure 5B:
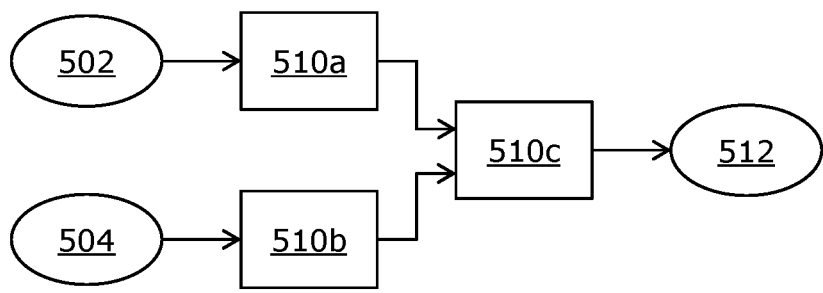

Referring to FIGS. 5A and 5B, illustrated are different exemplary sequence diagrams for generating at least one image, in accordance with different embodiments of the seventh aspect and the eighth aspect of the present disclosure. With reference to FIGS. 5A and 5B, event data 502 is read out from a plurality of neuromorphic sensors over a given time period. Simultaneously, image data 504 is read out from a plurality of photo-sensitive cells, wherein the image data 504 corresponds to a plurality of frames over the given time period.

With reference to FIG. 5A, the event data 502 and the image data 504 are processed using at least one neural network, depicted as a single neural network 506, to generate at least one image 508.

With reference to FIG. 5B, the event data 502 and the image data 504 are processed separately using a first neural network 510a and a second neural network 510b, respectively. An output from the first neural network 510a and an output from the second neural network 510b are further processed by a third neural network 510c, to generate at least one image 512.

It is to be noted that with reference to FIG. 5A, only one neural network is used for processing the event data 502 and the image data 504, whereas with reference to FIG. 5B, a cascade of neural networks is used for processing the event data 502 and the image data 504.

FIGS. 4B, 4C, 5A, and 5B are merely examples, which should not unduly limit the scope of the claims herein. The person skilled in the art will recognize many variations, alternatives, and modifications of embodiments of the present disclosure.

Optionally, the at least one processor is configured to:

read out another image data from the plurality of photo-sensitive cells; and process the another image data, using the at least one neural network, to generate another image.

In this regard, when the event data is not detected, it indicates no event has been occurred in the given time period, and thus only the another image data to generate the another image, using the at least one neural network, in a similar manner as discussed earlier in detail with respect to the aforementioned first aspect. It is to be noted that the at least one neural network (namely, a same neural network) could be utilised for processing the another image data, in a case when no event data is detected.

Optionally, when reading out the image data, the at least one processor is configured to use at least two different settings pertaining to at least one of: an exposure time, a sensitivity, an aperture size for any one of:

(i) different colour filters in a given array of a same colour, wherein a given smallest repeating unit of the colour filter array comprises one array of red colour filters, one array of blue colour filters and two arrays of green colour filters, (ii) a first sub-set of sequences and a second sub-set of sequences, the sequences of the first sub-set and the sequences of the second sub-set being arranged in an alternating manner, a given sequence being a row or a column of smallest repeating units in the colour filter array, a given smallest repeating unit comprising at least one red colour filter, at least one blue colour filter and at least two green colour filters.

In this regard, the image data is read out using the at least two different settings i.e., using at least one of: different exposure times, different sensitivities, different aperture sizes. The technical benefit of using the at least two different settings for reading out the image data is that it facilitates in generating HDR images, without reducing any frame rate (i.e., there would not be any frame rate drop). Optionally, when processing the image data that is read out using the at least two different settings for any one of case (i) and case (ii), the at least one neural network performs at least one operation on said image data, that provide a result that is similar to applying at least one HDR imaging technique. It is to be noted that the image data is read out using the at least two different settings for the case (i) in a similar manner, as discussed earlier in detail with respect to the aforementioned third aspect. Furthermore, the image data is read out using the at least two different settings for the case (ii) in a similar manner, as discussed earlier in detail with respect to the aforementioned first aspect.

Referring again to FIG. 4B, "S1" refers to a first setting and "S2" refers to a second setting, wherein the first setting S1 and the second setting S2 are different from each other, and pertain to at least one of: different exposure times, different sensitivities, different aperture sizes. With reference to FIG. 4B, the image data is read out from the 16 photo-sensitive cells that correspond to the first row of the smallest repeating units in the CFA 410, using the first setting S1. The image data is read out from the another 16 photo-sensitive cells that correspond to the second row of the smallest repeating units in the CFA 410, using the second setting S2. The image data corresponding to all the aforesaid rows may be processed to generate an HDR image.

The present disclosure also relates to the method of the eighth aspect as described above. Various embodiments and variants disclosed above, with respect to the aforementioned seventh aspect, apply mutatis mutandis to the method of the eighth aspect.

Optionally, the method further comprises:

reading out another image data from the plurality of photo-sensitive cells; and processing the another image data, using the at least one neural network, for generating another image.

Optionally, in the method, the step of reading out the image data comprises using at least two different settings pertaining to at least one of: an exposure time, a sensitivity, an aperture size for any one of:

(i) different colour filters in a given array of a same colour, wherein a given smallest repeating unit of the colour filter array comprises one array of red colour filters, one array of blue colour filters and two arrays of green colour filters, (ii) a first sub-set of sequences and a second sub-set of sequences, the sequences of the first sub-set and the sequences of the second sub-set being arranged in an alternating manner, a given sequence being a row or a column of smallest repeating units in the colour filter array, a given smallest repeating unit compromising at least one red colour filter, at least one blue colour filer and at least two green colour filters.

The invention claimed is:

1. An imaging system comprising:

an image sensor comprising:

a plurality of photo-sensitive cells arranged on a photo-sensitive surface of the image sensor; and a colour filter array comprising a plurality of smallest repeating units arranged sequentially, wherein a given smallest repeating unit comprises one array of red colour filters, one array of blue colour filters and two arrays of green colour filters; and at least one processor configured to:

read out image data from the image sensor, wherein when reading out, the at least one processor is configured to employ subsampling in at least a region of the photo-sensitive surface, by:

reading out the image data from those photo-sensitive cells that correspond to at most 75 percent of each array of colour filters in smallest repeating units, wherein at least two different settings pertaining to at least one of: an exposure time, a sensitivity, an aperture size, are used for different colour filters in a given array of a same colour, and wherein the at least two different settings comprises at least one first setting and at least one second setting, wherein an order in which the at least one first setting and the at least one second setting are used for different colour filters in a given array of a same colour is different from an order in which the at least one first setting and the at least one second setting are used for different colour filters in a neighbouring array of the same colour; and skipping read out from those photo-sensitive cells that correspond to a remainder of each array of colour filters in the smallest repeating units; and process the image data, using at least one neural network, to generate a high dynamic range (HDR) image.

2. The imaging system of claim 1, wherein when reading out, the at least one processor is configured to bin at least two photo-sensitive cells that correspond to colour filters of a same colour in a given array and for which a same setting is used.

3. A method comprising:

reading out image data from an image sensor, by employing subsampling in at least a region of a photo-sensitive surface of the image sensor, wherein the image sensor comprises a plurality of photo-sensitive cells arranged on the photo-sensitive surface, and a colour filter array comprising a plurality of smallest repeating units arranged sequentially, wherein a given smallest repeating unit comprises one array of red colour filters, one array of blue colour filters and two arrays of green colour filters, and wherein the step of reading out the image data comprises:

reading out the image data from those photo-sensitive cells that correspond to at most 75 percent of each array of colour filters in smallest repeating units, wherein at least two different settings pertaining to at least one of: an exposure time, a sensitivity, an aperture size, are used for different colour filters in a given array of a same colour, and wherein the at least two different settings comprises at least one first setting and at least one second setting, wherein an order in which the at least one first setting and the at least one second setting are used for different colour filters in a given array of a same colour is different from an order in which the at least one first setting and the at least one second setting are used for different colour filters in a neighbouring array of the same colour; and skipping read out from those photo-sensitive cells that correspond to a remainder of each array of colour filters in the smallest repeating units; and processing the image data, using at least one neural network, for generating a high dynamic range (HDR) image.

* * * * *